(12) United States Patent
Ozbaysal et al.

(10) Patent No.: US 12,529,126 B2
(45) Date of Patent: *Jan. 20, 2026

(54) METHOD OF ADDITIVELY MANUFACTURING OR WELDING WITH A SUPERALLOY POWDER MIXTURE

(71) Applicant: SIEMENS ENERGY, INC., Orlando, FL (US)

(72) Inventors: Kazim Ozbaysal, Charlotte, NC (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 212 days.

This patent is subject to a terminal disclaimer.

(21) Appl. No.: 18/200,123

(22) Filed: May 22, 2023

(65) Prior Publication Data

US 2023/0295776 A1 Sep. 21, 2023

Related U.S. Application Data

(63) Continuation of application No. 17/577,583, filed on Jan. 18, 2022, now Pat. No. 11,697,865.

(Continued)

(51) Int. Cl.
*C22C 19/05* (2006.01)
*B22F 1/00* (2022.01)
(Continued)

(52) U.S. Cl.
CPC ............. *C22C 19/056* (2013.01); *B22F 1/09* (2022.01); *B22F 1/105* (2022.01); *B22F 5/04* (2013.01);
(Continued)

(58) Field of Classification Search
CPC ............... C22C 19/056; C22C 1/0433; C22C 19/057; C22C 30/00; C22C 2202/00;
(Continued)

(56) References Cited

U.S. PATENT DOCUMENTS 4,116,723 A 9/1978 Gell et al.
4,910,098 A 3/1990 Lee et al.
(Continued)

FOREIGN PATENT DOCUMENTS

EP 3257956 A1 12/2017
EP 3744864 A1 12/2020
(Continued)

*Primary Examiner* — John A Hevey
(74) *Attorney, Agent, or Firm* — Christopher L. Parmelee

(57) ABSTRACT

A superalloy powder mixture is provided for use with additive manufacturing or welding metal components or portions thereof that includes a high melt superalloy powder and a low melt superalloy powder. The superalloy powder mixture comprises by weight about 4% to about 23% chromium, about 4% to about 20% cobalt, 0% to about 8% titanium, about 1.5% to about 8% aluminum, 0% to about 11% tungsten, 0% to about 4% molybdenum, about 1% to about 13% tantalum, 0% to about 0.2% carbon, 0% to about 1% zirconium, 0% to about 4% hafnium, 0% to about 4% rhenium, 0% to about 0.1% yttrium and/or cerium, 0% to about 0.04% boron, 0% to about 2% niobium, greater than 40% nickel, greater than 4% in total of aluminum and optional titanium content. The high melt superalloy powder includes less than half the content by weight percent of tantalum compared to the content by weight percent of tantalum in the low melt superalloy powder.

19 Claims, 13 Drawing Sheets

Related U.S. Application Data

(60) Provisional application No. 63/139,102, filed on Jan. 19, 2021, provisional application No. 63/229,758, filed on Aug. 5, 2021, provisional application No. 63/286,208, filed on Dec. 6, 2021.

(51) Int. Cl.

| | | |
|---|---|---|
| *B22F 1/105* | (2022.01) | |
| *B22F 5/04* | (2006.01) | |
| *B22F 10/14* | (2021.01) | |
| *B22F 10/25* | (2021.01) | |
| *B22F 10/28* | (2021.01) | |
| *B22F 10/62* | (2021.01) | |
| *B22F 10/64* | (2021.01) | |
| *B22F 12/41* | (2021.01) | |
| *B23K 26/342* | (2014.01) | |
| *B23K 35/02* | (2006.01) | |
| *B23K 35/30* | (2006.01) | |
| *B23K 103/08* | (2006.01) | |
| *B29C 64/165* | (2017.01) | |
| *B33Y 10/00* | (2015.01) | |
| *B33Y 40/20* | (2020.01) | |
| *B33Y 70/00* | (2020.01) | |
| *B33Y 80/00* | (2015.01) | |
| *C22C 30/00* | (2006.01) | |
| *B22F 1/05* | (2022.01) | |

(52) U.S. Cl.
CPC .............. *B22F 10/14* (2021.01); *B22F 10/25* (2021.01); *B22F 10/62* (2021.01); *B22F 10/64* (2021.01); *B22F 12/41* (2021.01); *B23K 26/342* (2015.10); *B23K 35/0261* (2013.01); *B23K 35/304* (2013.01); *B29C 64/165* (2017.08); *B33Y 40/20* (2020.01); *B33Y 70/00* (2014.12); *B33Y 80/00* (2014.12); *C22C 19/057* (2013.01); *C22C 30/00* (2013.01); *B22F 1/05* (2022.01); *B22F 10/28* (2021.01); *B22F 2301/052* (2013.01); *B22F 2301/15* (2013.01); *B22F 2301/205* (2013.01); *B22F 2304/10* (2013.01); *B22F 2998/10* (2013.01); *B23K 2103/08* (2018.08); *B33Y 10/00* (2014.12); *C22C 2202/00* (2013.01)

(58) Field of Classification Search
CPC ..... C22C 19/00; C22C 19/055; C22C 19/058; B22F 1/09; B22F 1/105; B22F 5/04; B22F 10/14; B22F 10/25; B22F 10/62; B22F 10/64; B22F 12/41; B22F 1/05; B22F 10/28; B22F 2301/052; B22F 2301/15; B22F 2301/205; B22F 2304/10; B22F 2998/10; B22F 10/18; B23K 26/342; B23K 35/0261; B23K 35/304; B23K 2103/08; B23K 2101/001; B23K 2103/26; B23K 26/21; B23K 35/3033; B29C 64/165; B33Y 40/20; B33Y 70/00; B33Y 80/00; B33Y 10/00; B33Y 70/10; Y02P 10/25; C22F 1/10

See application file for complete search history.

(56) References Cited

U.S. PATENT DOCUMENTS

| | | |
|---|---|---|
| 5,240,491 A | 8/1993 | Budinger et al. |
| 5,725,692 A | 3/1998 | DeLuca et al. |
| 5,783,318 A | 7/1998 | Biondo et al. |
| 6,454,885 B1 | 9/2002 | Chesnes et al. |
| 6,468,367 B1 | 10/2002 | Mukira et al. |
| 8,034,154 B2 | 10/2011 | Singer et al. |
| 8,273,148 B2 | 9/2012 | Minor |
| 8,640,942 B1 | 2/2014 | Ozbaysal et al. |
| 8,986,604 B2 | 3/2015 | Green |
| 9,388,479 B2 | 7/2016 | Green |
| 10,076,811 B2 | 9/2018 | Ozbaysal |
| 10,577,679 B1 | 3/2020 | Wessman et al. |
| 10,752,978 B2 | 8/2020 | Hardy et al. |
| 10,753,211 B2 | 8/2020 | Cui et al. |
| 10,800,108 B2 | 10/2020 | Mark et al. |
| 10,875,128 B2 | 12/2020 | Xu et al. |
| 11,072,044 B2 | 7/2021 | Ozbaysal |
| 11,697,865 B2 * | 7/2023 | Ozbaysal ............... B33Y 40/20 148/538 |
| 11,712,738 B2 | 8/2023 | Ozbaysal et al. |
| 11,753,704 B2 * | 9/2023 | Ozbaysal ............. C22C 19/058 |
| 2007/0102483 A1 | 5/2007 | Pietruska et al. |
| 2007/0175546 A1* | 8/2007 | Hoppe ................. C22C 19/056 148/428 |
| 2009/0140030 A1 | 6/2009 | Amancherla et al. |
| 2009/0196760 A1 | 8/2009 | Harada et al. |
| 2012/0100030 A1 | 4/2012 | Green |
| 2014/0366996 A1 | 12/2014 | Goncharov et al. |
| 2015/0266136 A1 | 9/2015 | Bruck et al. |
| 2015/0290747 A1 | 10/2015 | Ozbaysal |
| 2016/0339544 A1* | 11/2016 | Xu ........................ C22C 1/0433 |
| 2016/0354842 A1* | 12/2016 | Schick .................. B33Y 10/00 |
| 2018/0347013 A1 | 12/2018 | Szuromi et al. |
| 2019/0389090 A1 | 12/2019 | Roy-Mayhew et al. |
| 2020/0087754 A1 | 3/2020 | Hibino et al. |
| 2021/0130932 A1 | 5/2021 | Goncharov et al. |
| 2021/0140015 A1 | 5/2021 | Engeli et al. |
| 2021/0246534 A1 | 8/2021 | Cui et al. |
| 2021/0323056 A1 | 10/2021 | Burbaum et al. |
| 2022/0226893 A1 | 7/2022 | Ozbaysal et al. |
| 2022/0226904 A1 | 7/2022 | Ozbaysal et al. |
| 2022/0226938 A1 | 7/2022 | Ozbaysal et al. |
| 2022/0251685 A1 | 8/2022 | Burbaum et al. |

FOREIGN PATENT DOCUMENTS

| | | |
|---|---|---|
| EP | 3131697 B1 | 3/2021 |
| EP | 3854516 A1 | 7/2021 |
| GB | 2486046 B | 12/2012 |
| WO | 2021021231 A1 | 2/2021 |
| WO | 2021021232 A1 | 2/2021 |

\* cited by examiner

Successively depositing and fusing together layers of a superalloy powder mixture comprising a high melt superalloy powder and a low melt superalloy powder to build up an additive portion of a superalloy component  1802

Heat treating the additive portion at a temperature at or above 1200°C to form a homogenized base alloy of which the additive portion is comprised, which base alloy has a chemistry defined by the superalloy powder mixture, wherein the low melt superalloy powder has a solidus temperature lower than the solidus temperature of the high melt superalloy powder by between 50°C and 220°C, wherein each of the high melt superalloy powder, the low melt superalloy powder, and the superalloy powder mixture have a nickel content by weight greater than 40% and have an aluminum content by weight of greater than 1.5%  1804

Successively depositing and fusing together layers of a superalloy powder mixture comprising a high melt superalloy powder and a eutectic powder to build up an additive portion of the superalloy component  1902

Heat treating the additive portion at a temperature at or above 1200°C to cause crack healing in the additive portion, wherein the heat-treated additive portion defines a base alloy having a chemistry corresponding to the superalloy powder mixture, wherein the solidus temperature of the eutectic powder is more than 220°C below the solidus temperature of the high melt superalloy powder, wherein each of the high melt superalloy powder and the superalloy powder mixture have a nickel content by weight greater than 40% and have an aluminum content by weight of at least 1.5%  1904

METHOD OF ADDITIVELY MANUFACTURING OR WELDING WITH A SUPERALLOY POWDER MIXTURE

BACKGROUND

The present disclosure relates generally to the field of additive manufacturing and welding, and more particularly, to additively manufacturing and/or welding components made of difficult-to-weld superalloys used in gas turbines and other high temperature applications.

Nickel-base superalloys are metal alloys capable of being used to form gamma-prime (γ') precipitation-strengthened metal parts that have a favorable combination of mechanical strength and resistance to thermal fatigue, oxidation, type I or type II corrosion, and thermal creep deformation. High γ' forming nickel-base superalloys are typically used in high temperature applications (e.g., above 950° C.). For example, parts casted from such superalloys may include blades, guide vanes and other hot gas path components that are used in aerospace, marine, and industrial gas turbine engines. However, additively manufacturing and/or welding of high γ' forming nickel-base superalloy materials has been known to be difficult as such superalloys experience solidification and grain boundary liquation cracking problems during such processes. Further, during subsequent heat treatments such additively manufactured or welded superalloy components are sensitive to strain-age cracking. Thus, there exists a need for improved processes for welding and/or additively manufacturing components made from superalloys and in particular difficult-to-weld nickel-base superalloys, which reduces the amount, size and/or volume of pores and cracks and avoids a need to carry out a hot isostatic pressing operation to collapse such pores and cracks in order to produce a part usable in a high temperature application.

BRIEF SUMMARY

Variously disclosed embodiments include systems and methods that may be used to facilitate additively manufacturing components (or portions thereof) made from one or more superalloys. In an example, the elements that make up a difficult-to-weld superalloy are divided into at least two portions referred to herein as a high melt superalloy powder and a low melt superalloy powder, such that when the two portions are combined in a mixture at a predetermined ratio, additively manufacturing or welding using this superalloy powder mixture produces less microcracking.

In an aspect, a superalloy powder mixture for additively manufacturing or welding metal components or portions thereof includes at least 51% by weight a high melt superalloy powder and at least 5% by weight a low melt superalloy powder, where the low melt superalloy powder has a solidus temperature lower than the solidus temperature of the high melt superalloy powder by between 50° C. and 220° C., where each of the high melt superalloy powder, the low melt superalloy powder, and the superalloy powder mixture have a nickel content by weight greater than 40%, and have an aluminum content by weight of greater than 1.5%, where the low melt superalloy powder includes at least 5% by weight of tantalum, and where the high melt superalloy powder includes less than half the content by weight percent of tantalum compared to the content by weight percent of tantalum in the low melt superalloy powder.

In another aspect a method includes additively manufacturing at least a portion of a metal component using the superalloy powder mixture.

In a further aspect a method includes welding a metal component using the superalloy powder mixture.

In another aspect a method of additively manufacturing includes successively depositing and fusing together layers of the superalloy powder mixture, to build up an additive portion, and heat treating the additive portion at a temperature at or above 1200° C. to form a homogenized base alloy of which the additive portion is comprised, which base alloy has a chemistry defined by the superalloy powder mixture.

In another aspect a method of additively manufacturing includes dispensing a combination of a binder and the superalloy powder mixture, and heat treating the component in a furnace to: burn out the binder, solid state sinter the component, melt the low melt superalloy powder to fill internal pores of the component, form via homogenization a base alloy of which the component is comprised, which base alloy has a chemistry defined by the superalloy powder mixture.

In a further aspect, a method of additively manufacturing includes: dispensing a first combination of a binder and a high melt superalloy powder, layer by layer to build up an additive portion comprised of the first combination; dispensing a second combination of a binder and a low melt superalloy powder, to produce at least one sheet comprised of one or more layers of the second combination on at least one surface of the additive portion; and heat treating the additive portion in a furnace to: burn out the binder in the additive portion; solid state sinter the additive portion; melt the low melt superalloy powder in the at least one sheet to fill internal pores of the additive portion; form via homogenization a base alloy of which the additive portion is comprised, which base alloy has a chemistry defined by both the high melt superalloy powder and the low melt superalloy powder from the first and second combinations, where the low melt superalloy powder has a solidus temperature lower than the solidus temperature of the high melt superalloy powder by between 50° C. and 220° C., where each of the high melt superalloy powder, the low melt superalloy powder, and the base alloy have a nickel content by weight greater than 40% and have an aluminum content by weight of greater than 1.5%, where the low melt superalloy powder includes at least 5% by weight of tantalum, and where the high melt superalloy powder includes less than half the content by weight percent of tantalum compared to the content by weight percent of tantalum in the low melt superalloy powder.

In another aspect an extrudable filament for additively manufacturing includes the superalloy powder mixture and a binder that binds the superalloy powder mixture together, where the binder includes a polymer, and where the filament comprises greater than 50% by volume superalloy powder mixture and less than 50% by volume binder.

In a further aspect a welding wire includes a metal tubular sheath that surrounds the superalloy powder mixture, where the metal sheath comprises nickel.

In another aspect, a wire for additively manufacturing or welding metal components or portions thereof including an elongated body, where the elongated body includes therein a superalloy powder mixture including: at least 51% by weight a high melt superalloy powder; and at least 5% by weight a low melt superalloy powder. The low melt superalloy powder has a solidus temperature lower than the solidus temperature of the high melt superalloy powder by between 50° C. and 220° C. Each of the high melt superalloy powder, the low melt superalloy powder, and the superalloy powder mixture have an aluminum content by weight of greater than 1.5%, wherein the low melt superalloy powder includes at least 5% by weight of tantalum. Also, the high melt superalloy powder includes less than half the content by weight percent of tantalum compared to the content by weight percent of tantalum in the low melt superalloy powder.

In another aspect a metal component includes at least a portion thereof comprised of a superalloy having a chemistry corresponding to the superalloy powder mixture.

In another aspect a turbine blade or guide vane includes at least a portion thereof comprised of a superalloy having a chemistry corresponding to the superalloy powder mixture.

In another aspect a pre-sintered preform includes at least a portion thereof comprised of a superalloy having a chemistry corresponding to the superalloy powder mixture.

In a further aspect a high melt superalloy includes by weight 7.7% to 8.1% chromium, 10.6% to 11% cobalt, 4.5% to 6.5% aluminum, 10.6% to 11% tungsten, 0.3% to 0.55% molybdenum, 0.05% to 0.08% carbon, and greater than 40% nickel.

In a further aspect a low melt superalloy includes by weight 9.5% to 10.5% chromium, 2.9% to 3.4% cobalt, 8.0% to 9.0% aluminum, 3.8% to 4.3% tungsten, 0.8% to 1.2% molybdenum, 10% to 20% tantalum, 3% to 12% hafnium, and greater than 40% nickel.

In a further aspect a low melt superalloy includes by weight 9.5% to 10.5% chromium, 2.9% to 3.4% cobalt, 7.0% to 9.0% aluminum, 3.8% to 4.3% tungsten, 0.8% to 1.2% molybdenum, 12% to 22% tantalum, and greater than 40% nickel.

In aspects the low melt superalloy and/or the high melt superalloy may be in the form of a powder, in particular having powder particles with a powder size distribution between 10-100 micrometers In aspects, the superalloy powder mixture may have a total of aluminum and optional titanium content by weight of greater than 4%.

In aspects, the superalloy powder mixtures may comprise by weight of 4% to 23% chromium, 4% to 20% cobalt, 0% to 8% titanium, 1.5% to 8% aluminum, 0% to 11% tungsten, 0% to 4% molybdenum, 1% to 13% tantalum, 0% to 0.2% carbon, 0% to 1% zirconium, 0% to 4% hafnium, 0% to 4% rhenium, 0% to 0.1% yttrium and/or cerium, 0% to 0.04% boron, 0% to 2% niobium, 0% to 1.5% optional incidental elements and unavoidable impurities, and balance nickel.

In aspects, each of the high melt superalloy powder, the low melt superalloy powder, and the superalloy powder mixture may have an aluminum content by weight of greater than 4.0%.

In aspects, the low melt superalloy powder may include at least 10% by weight of tantalum.

In aspects, the low melt superalloy powder may include at least 0.5% by weight of hafnium, and the high melt superalloy powder may include less than half the content by weight percent of hafnium compared to the content by weight percent of hafnium in the low melt superalloy powder.

In aspects, at least one of the amounts of chromium, aluminum, or molybdenum in weight percent in the low melt superalloy powder may be at least 15% to 75% less than the corresponding weight percent in the high melt superalloy powder.

In aspects, at least one of the amounts of cobalt or tungsten in weight percent in the high melt superalloy powder may be at least 50% to 75% less than the corresponding weight percent in the low melt superalloy powder.

In aspects, the low melt superalloy powder may have a liquidus temperature above 1300° C.

In aspects, each of the high melt superalloy powder, the low melt superalloy powder, and the superalloy powder mixture may have a nickel content by weight greater than 45% and an aluminum content by weight of greater than 5.5%.

In aspects, the low melt superalloy powder may include by weight at least 8% aluminum.

In aspects, the low melt superalloy powder may include by weight at least 3% hafnium.

In aspects, the high melt superalloy powder may include by weight at maximum 4.5% tantalum, in particular at maximum 4.0% tantalum, further in particular less than 3.5% tantalum, further in particular less than 1.9% tantalum, further in particular at maximum 1.0% tantalum, further in particular at maximum 0.05% tantalum, further in particular 0% tantalum.

In aspects, the high melt superalloy powder may include at maximum 0.05% by weight of hafnium.

In aspects, the low melt superalloy powder may include by weight at maximum 3.4% cobalt, in particular between 2.9% and 3.4% cobalt.

In aspects, the low melt superalloy powder may include by weight at least 3.8% tungsten, in particular 3.8% to 4.3% tungsten.

In aspects, the superalloy powder mixture may comprise by weight at least 9% tungsten.

In aspects, the superalloy powder mixture may include at maximum 6.2% by weight of tantalum.

In aspects, the low melt superalloy powder may have a solidus temperature lower than the solidus temperature of the high melt superalloy powder by between 70° C. and 200° C., in particular between 90° C. and 170° C., further in particular between 100° C. and 160° C., and further in particular between 120° C. and 140° C.

In aspects, the low melt superalloy powder may have a solidus temperature below the grain boundary melting temperature of a homogenized base alloy by between 10° C. and 150° C., in particular between 10° C. and 100° C., further in particular between 10° C. and 50° C., further in particular between 20° C. and 50° C., further in particular between about 35° C. and 45° C., which base alloy is defined by the chemistry of the superalloy powder.

In aspects, the high melt superalloy powder may have a solidus temperature between 1330° C. and 1450° C., in particular between 1350° C. and 1430° C.

In aspects, the low melt superalloy powder may have a solidus temperature between 1200° C. and 1370° C., in particular between 1210° C. and 1360° C.

In aspects, the superalloy powder mixture may include by weight at maximum 0.5% titanium, in particular at maximum 0.05% titanium, further in particular at maximum 0.005% titanium.

In aspects, the superalloy powder mixture may have an aluminum content by weight of at least 6%.

In aspects, the high melt superalloy powder may include by weight 4.5% to 6.5% aluminum.

In aspects, the low melt superalloy powder may include by weight at least 8% aluminum, in particular 8% to 9% aluminum.

In aspects, the superalloy powder mixture may include by weight at maximum 2.0% hafnium.

In aspects, the low melt superalloy powder may include by weight 10% to 20% tantalum and 3% to 12% hafnium.

In aspects, at least one of the low melt superalloy powder or the high melt superalloy powder may include by weight 0.03% to 0.07% yttrium and/or cerium.

In aspects, the low melt superalloy powder may include by weight at maximum 0.08% carbon.

In aspects, the high melt superalloy powder may include by weight 0% to 2% titanium, 0% to 1% tantalum, 0% to 1% zirconium, 0% to 0.05% hafnium, 0% to 0.05% rhenium, 0% to 0.1% yttrium and/or cerium, and/or 0% to 0.04% boron.

In aspects, the low melt superalloy powder may include by weight 0% to 2% titanium, 0% to 0.08% carbon, 0% to 1% zirconium, 0% to 0.05% rhenium, 0% to 0.1% yttrium and/or cerium, and/or 0% to 0.04% boron.

In aspects, the low melt superalloy powder may include by weight 0% to 2% titanium, 0% to 0.08% carbon, 0% to 1% zirconium, and 0% to 12% hafnium, 0% to 3.2% rhenium, 0% to 0.1% yttrium and/or cerium, and/or 0% to 0.04% boron.

In aspects, the high melt superalloy powder may include by weight 6% to 7.3% chromium, 11% to 13% cobalt, 5.5% to 6.5% aluminum, 4.7% to 5.2% tungsten, 1.2% to 2.2% molybdenum, and 2% to 4.2% rhenium.

In aspects, the high melt superalloy powder may include by weight 0% to 0.05% titanium, 0% to 4.5% tantalum, 0% to 0.15% carbon, 0% to 1% zirconium, 0% to 1.7% hafnium, 0% to 0.1% yttrium and/or cerium, and/or 0% to 0.04% boron.

In aspects, the low melt superalloy powder may include at least 7% by weight of titanium, and wherein the high melt superalloy powder may include less than half the content by weight percent of titanium compared to the content by weight percent of titanium in the low melt superalloy powder.

In aspects, each of the superalloy powder mixture, the high melt superalloy powder, and the low melt superalloy powder may include by weight 0% to 0.01% of one or more unavoidable impurities.

In aspects, each of the superalloy powder mixture, the high melt superalloy powder, and the low melt superalloy powder may include by weight 0% to 1.5% of one or more incidental elements other than Cr, Co, Ti, Al, W, Mo, Ta, C, Zr, Hf, Re, Y, Ce and B.

In aspects, the superalloy powder mixture may include by weight 7.8% to 8.8% chromium.

In aspects, the superalloy powder mixture may include by weight 11.7% to 15.5% chromium.

In aspects, the high melt superalloy powder may include by weight at maximum 0.05% titanium, preferably 0.005% titanium.

In aspects, the high melt superalloy powder may include by weight 7.7% to 8.1% chromium.

In aspects, the high melt superalloy powder may include by weight 12% to 16% chromium.

In aspects, the low melt superalloy powder may include by weight at maximum 0.05% titanium, preferably 0.005% titanium.

In aspects, the ratio of the high melt superalloy powder to the low melt superalloy powder by weight may be between 95:05 and 51:49, in particular between 90:10 and 70:30, further in particular between 85:15 and 75:25, further in particular between 82:18 and 78:22, and further in particular between 94:06 and 76:24, in the superalloy powder mixture.

In aspects, at least 70% by weight of the additive portion may be formed from the high melt superalloy powder and the low melt superalloy powder, with the balance including at least one intermediate melt superalloy powder that is nickel-base and that has a solidus temperature between the solidus temperatures of the respective high and low melt superalloy powders.

In aspects, at least 70%, in particular at least 90%, further in particular at least 95%, further in particular at least 99%, further in particular 100%, by weight of the additive portion may be formed from the high melt superalloy powder and the low melt superalloy powder.

In aspects, the low melt superalloy powder may have a chemistry that prior to heat treating of the additive portion enables the low melt superalloy powder to fill solidification cracks in each deposited layer in order to reduce solidification cracks in the deposited layer.

In aspects, the low melt superalloy powder may have a chemistry that prior to any heat treating of the additive portion enables the low melt superalloy powder to enable each deposited layer to exert less strain on the heat affected zone (HAZ) layer grain boundaries in order to reduce grain boundary cracking.

In aspects, the low melt superalloy powder may have a chemistry that prior to the heat treating of the additive portion enables the low melt superalloy powder to solidify after the liquified grain boundaries of the heat affected zone (HAZ) solidify and gain strength in order to reduce HAZ liquification cracking.

In aspects that include a binder, the binder may include a polymer, and the combination may comprise greater than 50% by volume superalloy powder mixture and less than 50% by volume binder.

In aspects that include a binder, the binder may include a thermoplastic and/or a wax.

In aspects that include the second combination, the second combination may further include the high melt superalloy powder.

In aspects that include the second combination, the ratio of the high melt superalloy powder to the low melt superalloy powder in the sheet by weight may be between 05:95 and 30:70, in particular between 10:90 and 25:75, further in particular between 18:82 and 22:78.

In aspects directed to a method, the method may further include heating the metal component in a furnace to at least partially homogenize portions formed from the superalloy powder mixture.

In aspects directed to a method, the method may further include heating the metal component in a furnace at a temperature at or above 1200° C. for at least for 120 minutes.

In aspects directed to a method, the additive portion may be built-up on a substrate corresponding to a preexisting metal component having a chemistry that does not correspond to the base alloy.

In aspects directed to a method, the method may further include brazing the additive portion to a metal component.

In aspects directed to a method, such a metal component may include greater than 0.05% titanium by weight, and the base alloy may include at maximum 0.05% titanium by weight.

In aspects directed to a method, such a metal component may include a root of a blade.

In aspects directed to a method, the additive portion may form at least a portion of a turbine blade or turbine guide vane.

In aspects directed to a method, the superalloy powder mixture may be deposited and fused together via a selective laser melting (SLM) 3D printer to form the additive portion.

In aspects directed to a method, the superalloy powder mixture may be deposited and fused together via a Directed Energy Deposition (DED) nozzle that both provides the superalloy powder mixture and emits an energy beam that melts the superalloy powder mixture to form the additive portion.

In aspects directed to a method, the superalloy powder mixture may be deposited and fused together via a laser wire deposition (LWD) system, which employs a welding wire to provide the superalloy powder mixture.

In aspects directed to a method, during successively depositing and fusing together layers of a superalloy powder mixture, the method may include the deposited superalloy filling cracks and/or preventing cracking in order to reduce the total of lengths of cracks in cross-sections of the additive portion to on average less than 1.0 mm/mm$^2$.

In aspects directed to a method, the superalloy powder mixture may have a composition that prior to heat treating of the additive portion causes the superalloy powder mixture to produce less microcracking as the additive portion cools to room temperature relative to alternatively carrying out the method by building up the additive portion using a powder comprised of only the base alloy.

In aspects directed to a method, the superalloy powder mixture may have a composition that prior to heat treating of the additive portion causes the superalloy powder mixture to produce less microcracking as the additive portion cools to room temperature relative to alternatively carrying out the method by building up the additive portion using only the high melt superalloy powder without being mixed with the low melt superalloy powder.

In aspects directed to a method, the superalloy powder mixture may have a composition that prior to heat treating of the additive portion causes the superalloy powder mixture to produce less microcracking as the additive portion cools to room temperature relative to alternatively carrying out the method by building up the additive portion using only the low melt superalloy powder without being mixed with the high melt superalloy powder.

In aspects directed to a method, less microcracking may be achieved without carrying out a hot isostatic pressing operation on the additive portion.

In aspects directed to a method, the base alloy may have γ' volume fractions greater than 30%, in particular greater than 50%, further in particular greater than 70%.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures or steps for carrying out the same purposes of the present disclosure. Those skilled in the art will also realize that such equivalent constructions or steps do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

To easily identify the discussion of any particular element or act, the most significant digit or digits in a reference number refer to the figure number in which that element is first introduced.

FIG. 18 illustrates a methodology that facilitates additively manufacturing according to the example LAAM process.

FIG. 19 illustrates a further methodology that facilitates additively manufacturing according to the example crack healing AM process.

DETAILED DESCRIPTION

Figure 1:
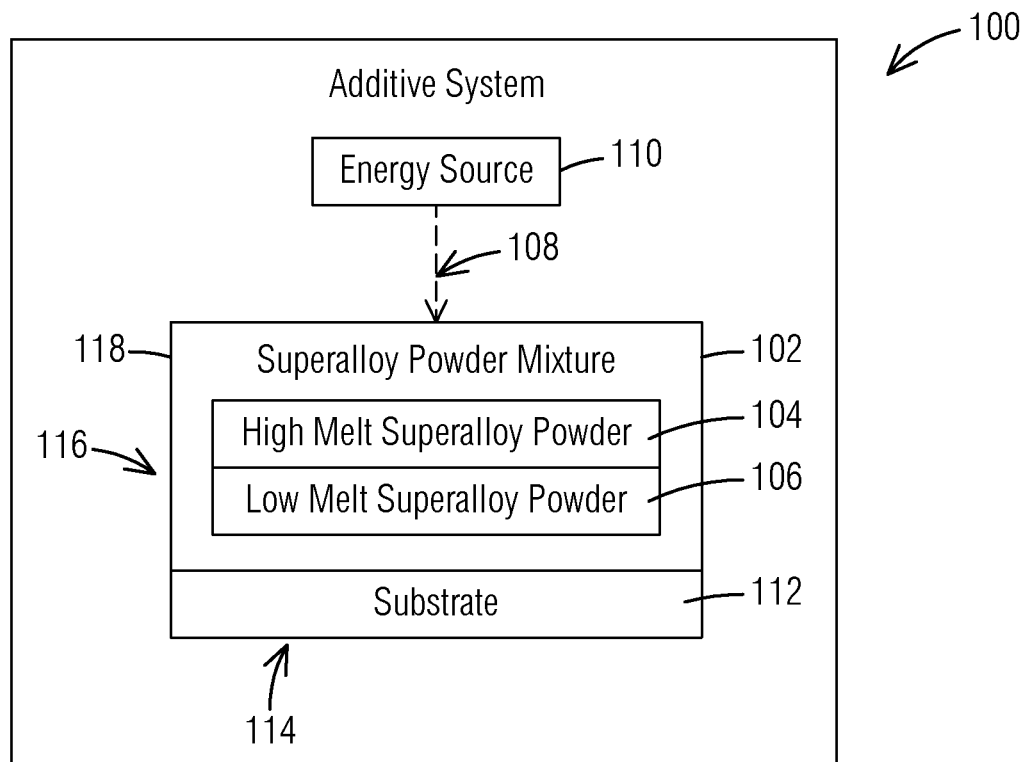
FIG. 1 illustrates a functional block diagram of an example system that facilitates additively manufacturing or welding at least a portion of a superalloy component via an example Liquid Assisted AM (LAAM) process.

Various technologies that pertain to systems, methods and materials that facilitate additively manufacturing (and/or welding) components made from superalloy materials will now be described with reference to the drawings, where like reference numerals represent like elements throughout. Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Example embodiments of one or more inventions described herein are directed to making components comprising nickel-base superalloys including greater than 40% nickel, which are gamma-prime ($\gamma'$) precipitation-strengthened capable by including greater than 4% by weight of aluminum and/or titanium to achieve $\gamma'$ volume fractions greater than 30%. Such superalloys are referred to herein as difficult-to-weld superalloys as their high $\gamma'$ fractions contribute to solidification and grain boundary liquation cracking problems when welded or when used in an additive manufacturing (AM) process to produce or repair metal components. Examples of commercially sold difficult-to-weld superalloys that are used in the construction of gas turbine components (e.g., gas turbine blades and guide vanes) include: CM 247 LC, René 142, René 80, and René N5 branded or trademarked superalloys. CM 247 LC is a trademark of Cannon-Muskegon Corporation, based in Michigan, US. Further examples of superalloys and processes for working with them are illustrated in U.S. Pat. No. 9,388,479 B2 issued Jul. 12, 2016, which is hereby incorporated herein by reference in its entirety.

The following examples illustrate a new process referred to herein as Liquid Assisted AM (LAAM), which enables the ability to carry out an AM process to manufacture and/or repair components made out of difficult-to-weld superalloys. With reference to FIG. 1, an example additive system 100 is schematically illustrate for carrying out this LAAM process. For AM processes, such an additive system 100 may correspond to a 3D printer such as a selective laser melting (SLM) 3D printer having a powder bed arrangement. However, as is discussed in more detail below, the described additive system 100 may correspond to other types of 3D printers and/or welding systems.

In this example, the additive system may be configured to apply a thin layer 116 of a superalloy powder mixture 102 onto a substrate 112 made of a superalloy or other metal. In some examples, an energy source 110 may be configured to selectively melt the layer (or predetermined portions thereof). For example, an energy source 110 such as a laser may be operated to output one or more energy beams 108 (such as laser beams) that are aimed at predetermined locations to melt the superalloy powder mixture 102 on the substrate 112 along various predetermined tool paths. The melted superalloy mixture will cool and solidify in fused connection with the substrate 112. This process of applying and melting the superalloy powder mixture may be done repeatedly to build up an additive portion 118, layer by layer, to generate a desired superalloy component 114 (or portion thereof). It should be appreciated, that the described substrate 112 may correspond to a previously deposited layer and/or may correspond to a preexisting part made out of a superalloy material or other metal. The additive portion 118 itself is referred to herein as being comprised of a base alloy, which has a chemistry corresponding to the superalloy powder mixture from which it was made.

In general, if the superalloy powder mixture was comprised of powder particles each made of only the base alloy, the resulting additive portion may likely include substantial microcracking which would make it unsuitable for use in many high temperature applications (such as the blades and guide vanes of a gas turbine) unless a hot isostatic pressing (HIP) operation was performed on the part to collapse the cracks. Hot isostatic pressing is a process wherein the component is subjected to both high temperature (above 482 C) and high gas (typically argon) pressure (above 50.7 MPa). The pressure is applied to the component by the gas from all directions (isostatic), which collapses internal porosity via plastic deformation, creep, and/or diffusion bonding. An example of such a HIP operation carried out in combination with a solution heat treatment is illustrated in U.S. Pat. No. 11,072,044 B2, issued Jul. 27, 2021, which is hereby incorporated by reference herein in its entirety.

However, in this described LAAM process, the superalloy powder mixture 102 is comprised of at least two different types of superalloy powders, each having respectively different solidus temperatures. The inventors have found that by carrying out this described LAAM process (in which the elements that make up the desired difficult-to-weld superalloy are divided into different powders), an otherwise difficult-to-weld superalloy base alloy becomes available to produce via AM or welding with substantially less microcracking. The reduction in microcracking may be sufficient to avoid the need to carry out a HIP operation in order to produce a superalloy part with physical properties corresponding to those achievable by using a HIP operation and potentially those achievable by casting the part out of the base alloy.

For example, as illustrated in FIG. 1, these different powders in the mixture may include a high melt superalloy powder 104 comprised of high melt superalloy powder particles; and a low melt superalloy powder 106 comprised of low melt superalloy powder particles having a solidus temperature lower than the high melt superalloy powder. These different powders in combination in a predetermined ratio include the elements in weight percent that are desired for the final base alloy for which the additive portion is desired to be made out of.

Once the additive portion 118 has been built-up by the additive system 100, using this described superalloy powder mixture 102, it may be heat treated via a furnace. Such a heat treatment may correspond to solution heat treatment that is operable to substantially to fully homogenize the mixture of elements in the base alloy of the additive portion 118. In an example embodiment, a solution heat treatment that at least substantially homogenizes the base alloy of the additive portion may include holding the base alloy at or above the solution heat treatment temperature of the base alloy for an extended time such as 12 hours, followed by cooling to room temperature. In another example, such a solution heat treatment may include heating the additive portion from room temperature to greater than 1200° C. (e.g., such as between 1300° C. and 1400° C.) at 2 to 20° C. per minute; holding the temperature of the additive portion at greater than 1200° C. (e.g., such as between 1300° C. and 1400°) for 120 to 1444 minutes; and argon cooling the additive portion to room temperature. In a further example (such as for example where the aluminum content of the base alloy of the additive portion is less than 4% by weight), a solution heat treatment may include heating the additive portion from room temperature to between 1100° C. and 1300° C. at 2 to 20° C. per minute; holding the temperature of the additive portion between 1200° C. and 1300° C. for 120 to 1444 minutes; and argon cooling the additive portion to room temperature.

However, it should be appreciated that a homogenization heat treatment may be carried out with more or less steps or different steps, temperatures, heating/cooling rates, and time ranges depending on the extent of homogenization that is needed for the particular part that is being produced and/or depending on the metallurgy and differences in metallurgy between the high and low melt superalloys that were used to create the base alloy of the additive portion. As used herein, a substantially homogenized base alloy is one in which atoms of the elements originally from the different high and low melt powder particles migrate in the additive portion to produce a relatively more uniform distribution of elements throughout the base alloy in order to provide the base alloy with the desired superalloy composition.

It should be noted that references to the metallurgy, chemistry, solidus temperature, incipient melting temperature or other properties of the base alloy herein is with respect to the homogenized base alloy (unless otherwise noted). Also, it is to be understood that even though the described high and low melt superalloy powders are described as having a solidus temperature or other metallurgical properties, it is to be understood, that the particular superalloy metal of which these powder particles are made of, has these described solidus temperatures and/or other metallurgical properties described herein.

In example embodiments, each of the high melt superalloy powder, the low melt superalloy powder, the superalloy powder mixture, and the base alloy may have greater than 4% by weight of aluminum to achieve γ' volume fractions greater than 30% in the base alloy (and thus correspond to difficult-to-weld superalloys). Also for example, each of the high melt superalloy powder, the low melt superalloy powder, superalloy powder mixture, and the base alloy may have greater than 5% aluminum by weight. In example embodiments, the resulting base alloy in the additive portion may have γ' volume fractions greater than 50%. Also, in some example embodiments, (such as where the aluminum content by weight of the superalloy powder mixture and resulting base alloy are greater than 6%), the γ' volume fractions of the base alloy may be greater than 70%.

As will be described in more detail below, this example LAAM process is capable of producing additively manufactured or welded parts comprised of a variety of different base alloys for use in high temperature applications (e.g., blades and guide vanes of gas turbines or other applications). The following description illustrates several example chemistries for the high and low melt superalloy powders usable in this describe LAAM process. However, it is to be understood that this described LAAM process may be carried out with other high and low melt superalloy powder chemistries that have compositions capable of achieving the similar reductions in microcracking described herein, in view of the features of the LAAM process described herein.

In example embodiments, the difficult-to-weld superalloys from which the low and high melt superalloy powders are made, may have an aluminum and/or titanium content and each individually may be a high γ' alloy. However, it has been found that using aluminum rather than titanium can achieve greater oxidation resistance for gas turbine applications or other high temperature applications, at temperatures above 1100° C. Thus, some example high and low melt superalloys illustrated herein may include aluminum, but exclude titanium (or alternatively have a titanium content that is sufficiently low so as to avoid or at least acceptably minimize loss of oxidation resistance of the part in high temperature applications). However, it should be appreciated that when an application does not call for high oxidation resistance, high and/or low melt superalloys may include relatively larger amounts of titanium.

For example, to manufacture an additive portion 118 via an AM process having a composition without titanium and having operational characteristics (e.g., in a gas turbine) similar to or better than using casted CM 247 LC superalloy, the following example high and low melt nickel-base superalloy powders with the chemistries shown in Table I were used in the LAAM process to produce sample blocks:

TABLE I

LAAM Process Example

| Element | High Melt Superalloy (Wt %) | Low Melt Superalloy (Wt %) | Base alloy from 80/20 Superalloy Powder Mixture (Wt %) |
| --- | --- | --- | --- |
| Cr | 7.9 | 10 | 8.32 |
| Co | 10.8 | 3.1 | 9.26 |
| Ti | 0 | 0 | 0 |
| Al | 5.5 | 8.5 | 6.1 |
| W | 10.85 | 4.1 | 9.5 |
| Mo | 0.40 | 1 | 0.52 |
| Ta | 0 | 16 | 3.2 |
| C | 0.07 | 0 | 0.056 |
| Zr | 0.012 | 0 | 0.0096 |
| Hf | 0 | 8 | 1.6 |
| Re | 0 | 0 | 0 |
| Y | 0.05 | 0.05 | 0.05 |
| B | 0 | 0 | 0 |
| Ni | 64.418 | 49.25 | 61.3844 |

These high and low melt powders were mixed together in about an 80:20 ratio by weight respectively, to form a superalloy powder mixture. The resulting homogenized base alloy of the additive portions 118 (produced from such a superalloy powder mixture) may have a chemistry (based on an 80/20 ratio of high to low melt superalloy powders by weight) corresponding to that shown in Table I.

In example embodiments the high and low melt superalloy powders are mixed together to distribute their respective particles relatively more uniformly in the superalloy powder mixture. For example, such high and low melt superalloy powders may have a substantially uniform distribution by placing the high and low melt superalloy powders in a container and subjecting the container to vibration, rotation, and/or other mechanical activity in order to more uniformly distribute the different high and low melt superalloy powder particles in the mixture, such that there is less than a 10% variance on average in the distribution of powders by weight between any two halves of the mixture. In example embodiments, the high and low melt superalloy powders may have a powder size distribution between 10-60 micrometers (μm) with a spherical morphology. However, it should be understood that alternative embodiments may use other sizes and morphologies of powder depending on the desired base alloy properties and/or the powder bed characteristics of the SLM printer or other type of additive system (e.g., alternatively size distributions from 10-100 μm).

Figure 2:
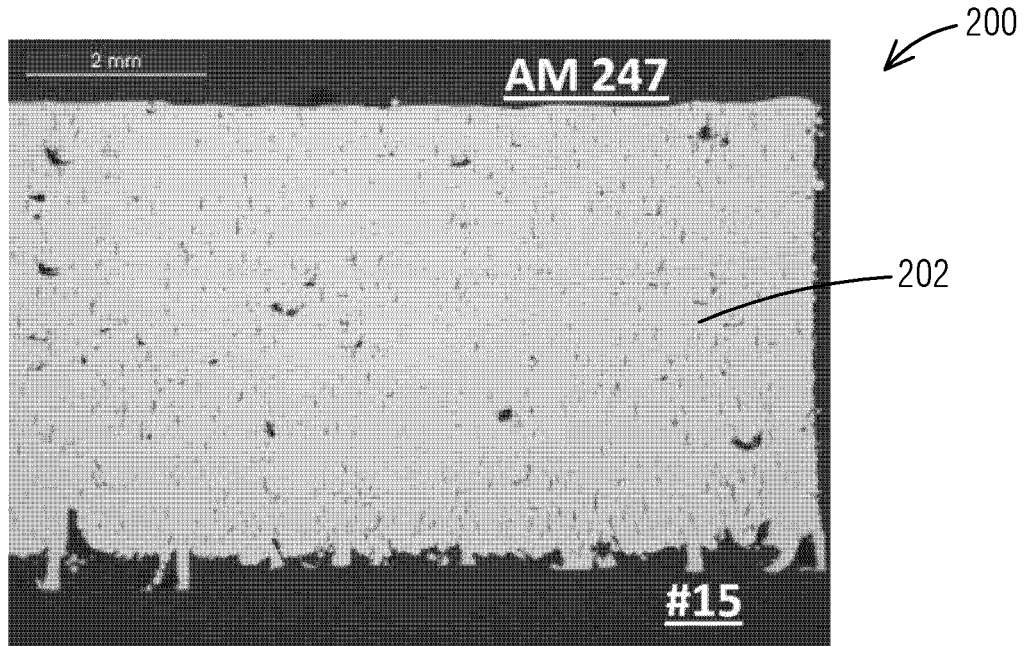
FIG. 2 illustrates an image of a cross-section of a sample block additively manufactured from a CM 247 LC superalloy using a conventional additive manufacturing process.
Figure 3:
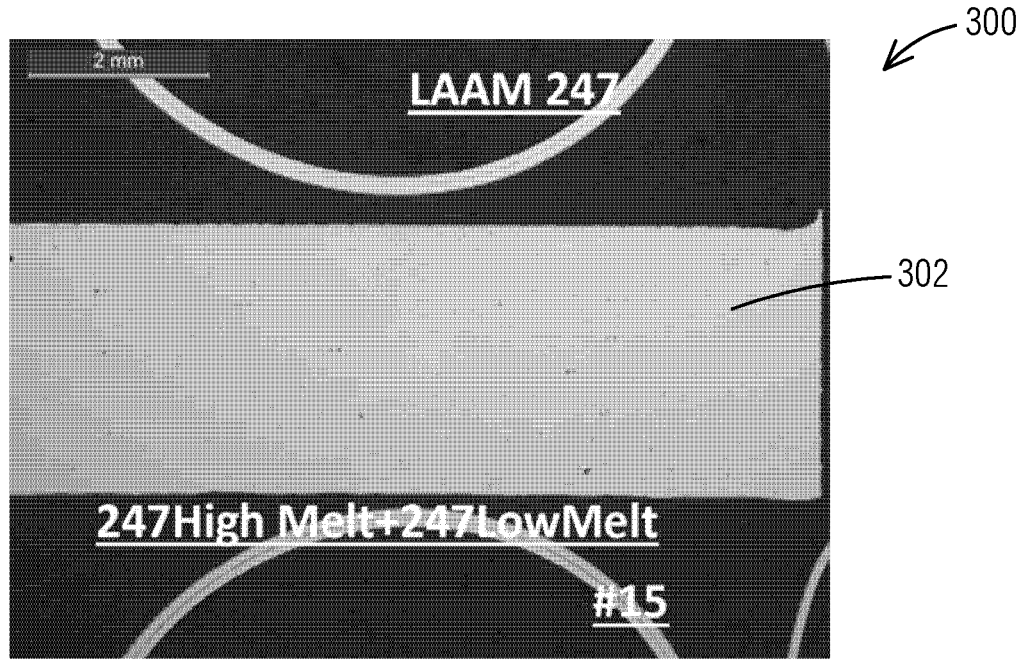
FIG. 3 illustrates an image of a cross-section of a sample block additively manufactured via the example LAAM process.
Figure 4:
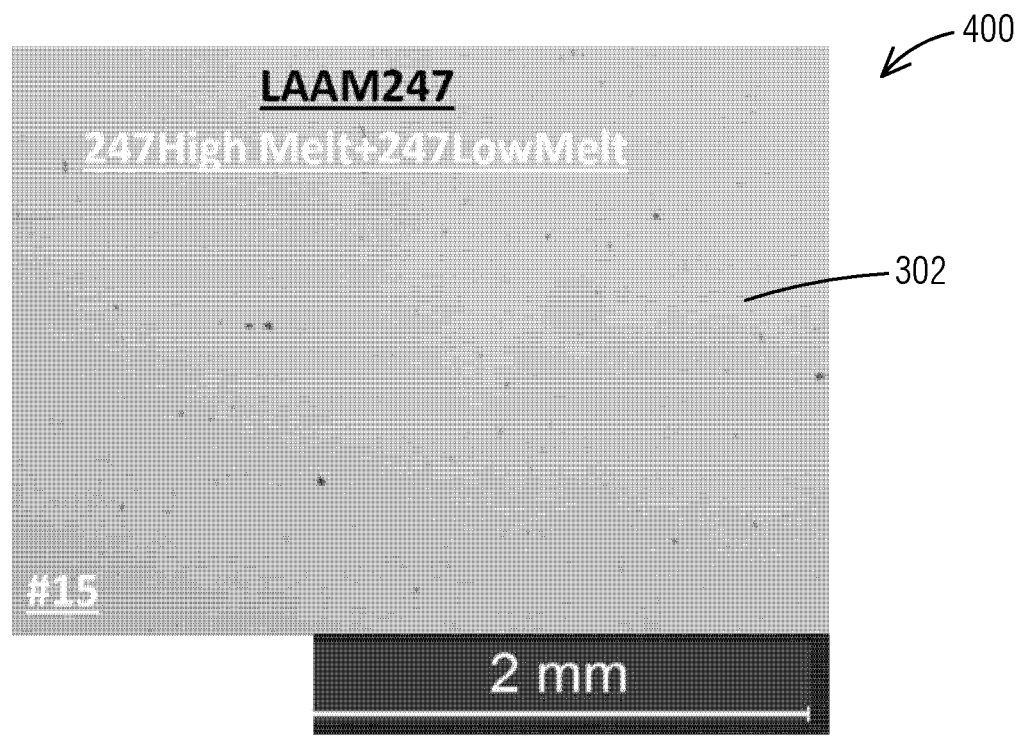
FIG. 4 illustrates a zoomed in view of the image depicted in FIG. 3.

FIG. 2 to FIG. 4 illustrate the improved reduction in cracks and pores found in an additive portion 118 generated using this described LAAM process compared to a corresponding 3D printed sample generated with the same 3D printer and AM process parameters for a superalloy powder solely comprised of a CM 247 LC superalloy.

For example, FIG. 2 shows an image 200 of a cross-sectional cut from a sample block 202 made of a CM 247 LC superalloy via an SLM 3D printer. It should be appreciated that the microstructure of the sample block 202 includes extensive amounts of microcracking and pores, which makes it unsuitable for use in gas turbine guide vanes and blades without a subsequent HIP operation. For comparison purposes, this example sample block 202 of the CM 247 LC superalloy is believed to have about the following chemistry shown in Table II:

TABLE II

A CM 247 LC Superalloy Example Chemistry and Nominal Ranges

| Element | Sample Block (Wt %) | Nominal Ranges (Wt %) |
|---|---|---|
| Cr | 8.3 | about 8.0-about 8.5, for example 8.05-8.35 |
| Co | 9.3 | about 9.0-about 9.5, for example 9.15-9.35 |
| Ti | 0.8 | about 0.6-about 0.9, for example 0.65-0.85 |
| Al | 5.6 | about 5.4-about 5.7, for example 5.55-6.65 |
| W | 9.5 | about 9.3-about 9.7, for example 9.45-9.55 |
| Mo | 0.5 | about 0.4-about 0.6, for example 0.45-0.55 |
| Ta | 3.2 | about 3.1-about 3.3, for example 3.15-3.25 |
| C | 0.1 | about 0.05-about 0.11, for example 0.06-0.11 |
| Zr | 0 | 0-about 0.02, for example 0-0.016 |
| Hf | 1.4 | about 1.3-about 1.5, for example 1.35-1.45 |
| Re | 0 | 0-about 0.05, for example <0.001 |
| Y and/or Ce | 0 | 0-about 0.01, for example <0.001 |
| B | 0 | 0-about 0.02, for example 0.00-0.016 |
| Ni and unavoidable impurities | Balance | |

FIG. 3 shows an image 300 of a cross-sectional cut from a sample block 302 made using a superalloy powder mixture having an 80:20 ratio by weight of the low and high melt superalloy powders with the respective chemistries shown in Table I. Sample block 302 was generated with an SLM printer and AM processing parameters corresponding to those that were used to generate the sample block 202 made of the CM 247 LC superalloy. The image 300 is shown after the block was heat treated to homogenize the base alloy as described previously. The image 200 shows its block after a similar heat treatment. It should be appreciated that the microstructure of the sample block 302 made via the described LAAM process shown in FIG. 3 includes substantially less cracks and pores compared to the additively manufactured CM 247 LC superalloy sample block 202 illustrated in FIG. 2.

It should be understood that this reduction in cracks and pores was achieved without the need to carry out a hot isostatic pressing (HIP) operation on the sample block 302, to close/collapse cracks and pores. It should also be noted that unlike some prior attempts to achieve weldability of difficult-to-weld nickel-base superalloys such as described in U.S. Pat. No. 10,753,211 B2 issued Aug. 25, 2020, no ceramic additive in a heterogeneous composition was required to achieve these results.

To further illustrate the reduction in cracks and pores via the described LAAM process, FIG. 4 shows a zoomed in image 400 of the cross-section of the sample block 302. In example embodiments, it is believed that the crack density in $mm/mm^2$ in cross-sections of the additive portion produced via the LAAM process (both before and after heat treatment and without HIP) on average is at least 50% lower than the crack density resulting from additively manufacturing corresponding sample blocks using a single powder made of only one of: CM 247 LC superalloy; the high melt superalloy; the low melt superalloy; and the base alloy.

For example, crack assessments of cross-sections of sample blocks produced via the LAAM process (e.g., such as those produced according to the chemistries illustrated in Table I), were carried out via a florescent penetration inspection (FPI). Cracks were defined as being elongated indications with length to width ratios of four or greater, and with lengths greater than 10 microns. The described LAAM process was found to be capable of producing such sample blocks that were observed via this crack assessment to be crack free.

European Patent Application No. EP 3 257 956 A1 published Dec. 20, 2017, also shows examples of high levels of crack density from additively manufacturing using CM 247 LC superalloy and MarM247 superalloy. The crack densities were assessed in EP 3 257 956 A1 to be above 2 $mm/mm^2$ for both CM 247 LC and MarM247. It is believed that the additive portion produced by the LAAM process may achieve crack densities well below 1.0 $mm/mm^2$ (and may be crack free as discussed previously) in view of the cross-sections observed for test blocks created using the LAAM process, without the need to increase the hafnium content of the resulting base alloy to 2.4% by weight as described in EP 3 257 956 A1. For example, the sample block 302 shown in FIG. 3 was achieved with a hafnium amount of about 1.6% by weight (See Table I). In example embodiments of the LAAM process, the superalloy powder mixture of the high and low melt superalloy powders may be configured so as to produce an additive portion having a base alloy, which typically has less than 2.0% by weight of hafnium. However, alterative embodiments may produce base alloys with greater than 2% hafnium by weight.

Figure 5:
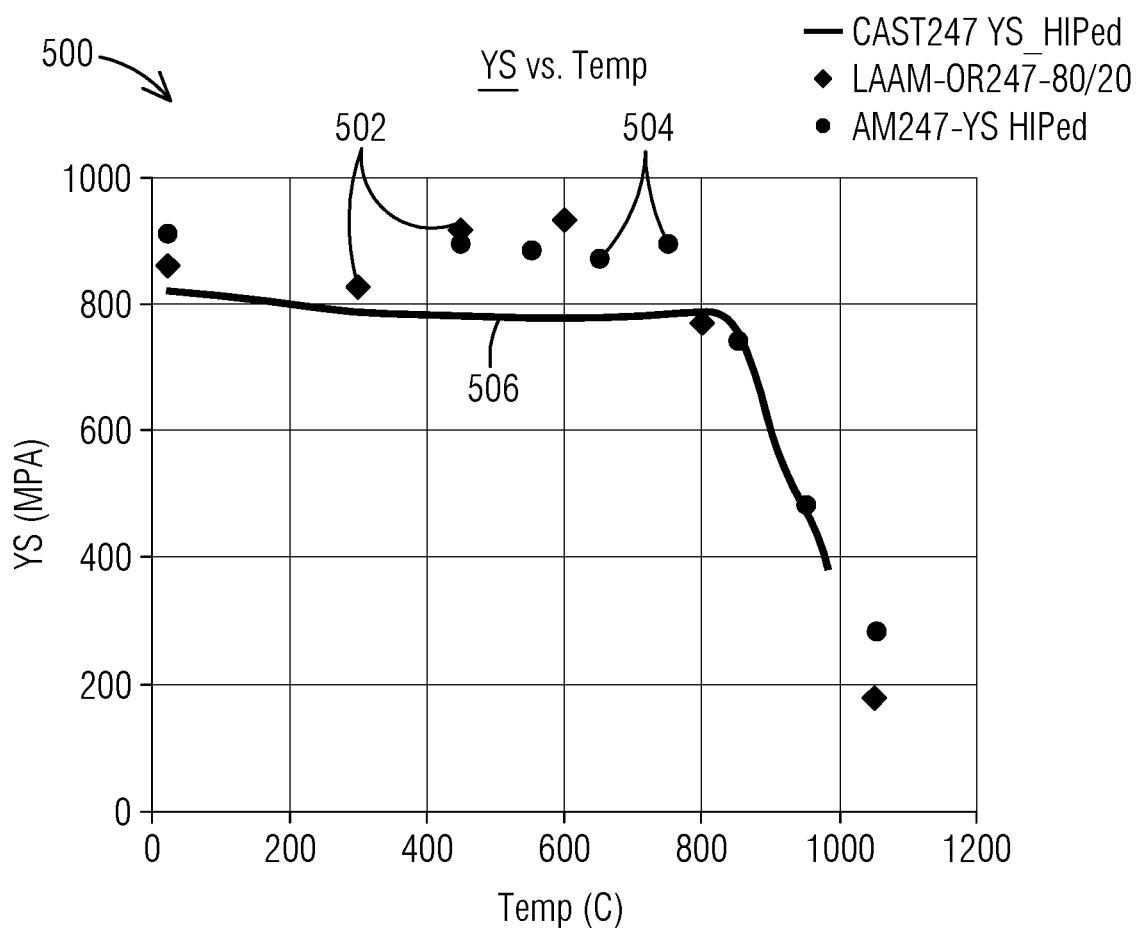
FIG. 5 illustrates a graph plotting yield strength comparing superalloy samples made via LAAM, via HIP of CM 247 LC superalloy, and via casted CM 247 LC superalloy.
Figure 6:
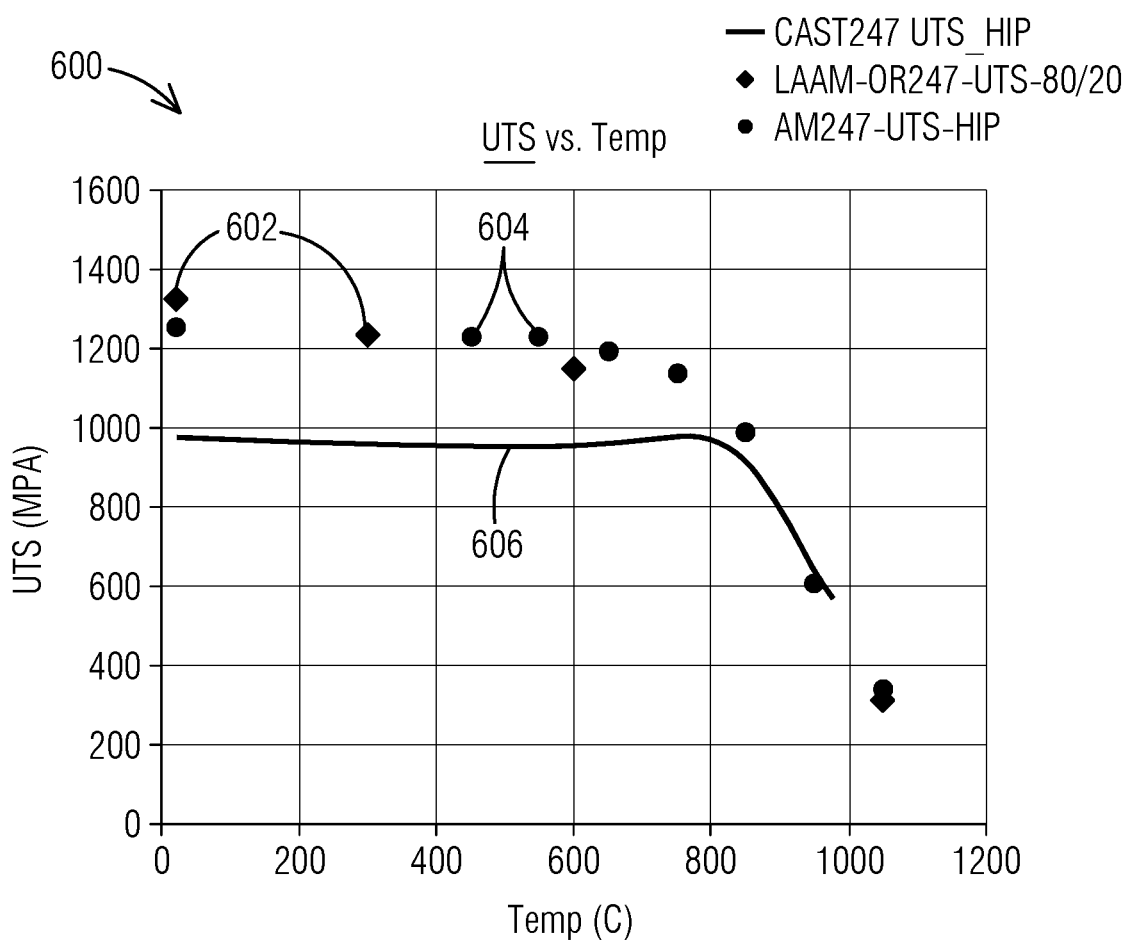
FIG. 6 illustrates a graph plotting tensile strength comparing superalloy samples made via LAAM, via HIP of CM 247 LC superalloy, and via casted CM 247 LC superalloy.
Figure 7:
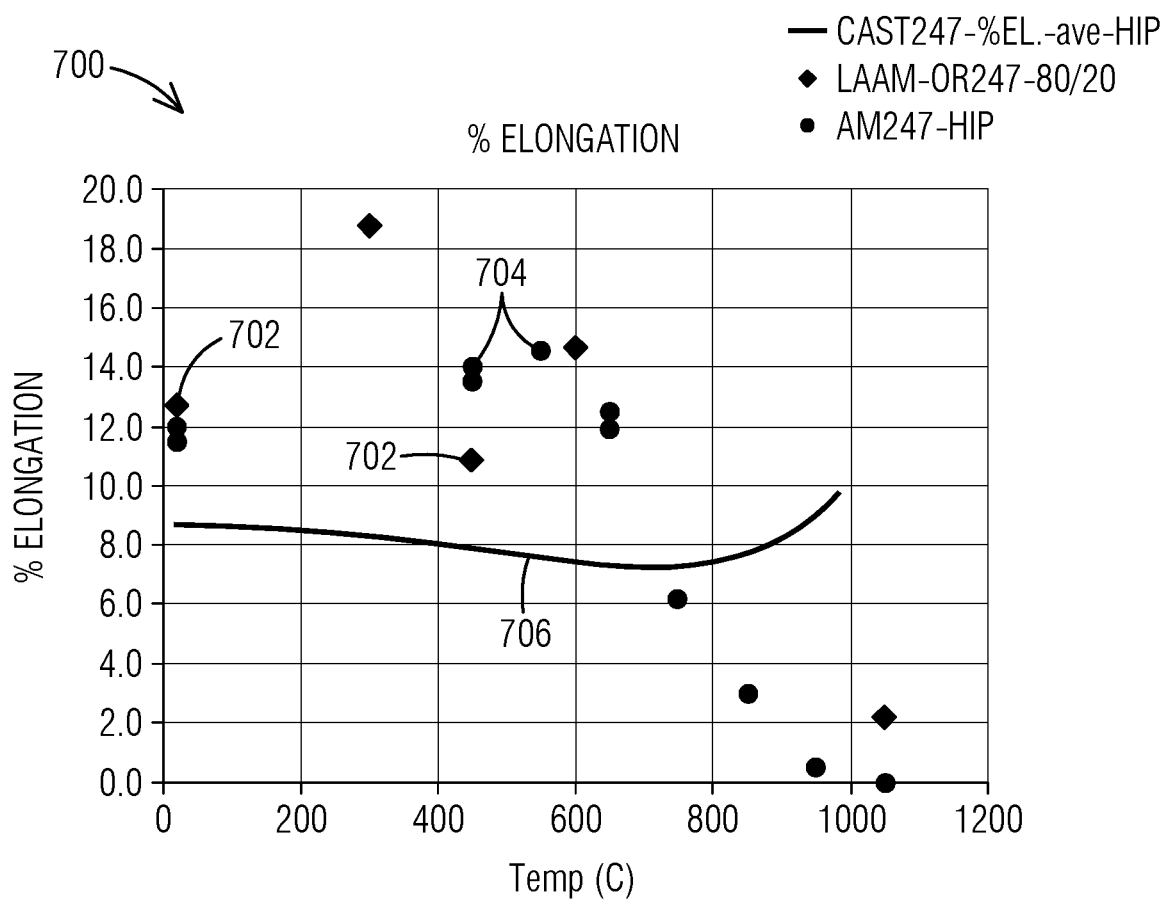
FIG. 7 illustrates a graph plotting elongation comparing superalloy samples made via LAAM, via HIP of CM 247 LC superalloy, and via casted CM 247 LC superalloy.

FIG. 5, FIG. 6, and FIG. 7 depict graphs 500, 600, 700 that plot tension test results 502, 602, 702 (via diamond shaped symbols) for sample blocks made using the described LAAM process. The superalloy powder mixture used to create these sample blocks had about an 80:20 ratio by weight of the high and low melt superalloy powders with the chemistries depicted in Table I. The LAAM sample blocks used for these tests were heat treated as described herein to homogenize the base alloy, but were not HIPed.

These graphs also plot test results 504, 604, 704 (via circle symbols) for sample blocks made via AM from a single CM 247 LC superalloy powder (with a chemistry depicted in Table II) after heat treatment and after HIP to close/collapse cracks and pores such as those depicted in FIG. 2. For these tests, both the non-HIPed LAAM created sample blocks and the HIPed CM 247 LC superalloy blocks, were printed with an SLM 3D printer and AM processing parameters substantially corresponding to those that were used to generate the sample block 202 and sample block 302. These tests were carried out according to ASTM E21 (high temp) & E8 (low temp) standards to produce test results that span from room temperature to over 1000° C. In addition, the graphs shown in FIG. 5, FIG. 6, FIG. 7 also illustrate tensile results for cast CM 247 LC via solid lines 506, 606, 706. These tensile results establish that the LAAM process is capable of producing superalloy components (or portions thereof) with high temperature physical properties with respect to yield strength (FIG. 5) tensile strength (FIG. 6) and % elongation (FIG. 7) without the need to carryout HIP, that are substantially similar to components made via AM from a single CM 247 LC superalloy powder (which are HIPed) and that are substantially similar to components made via cast CM 247 LC superalloy.

The inventors believe that to carry out the described LAAM process (and achieve the described reductions in microcracking and pores and these described tensile results without the need for HIPing), example high and low melt superalloy powders may be used with compositions such that:
- the solidus temperature of the low melt superalloy powder is below the grain boundary melting temperature of the base alloy.
- the solidus temperature of the low melt superalloy powder is well below the solidus temperature of the high melt superalloy powder.

As is convention in the art, the term liquidus temperature corresponds to the lowest temperature at which an alloy is completely liquid, and the term solidus temperature is the highest temperature at which an alloy is completely solid (at 1 atm).

For the example high and low melt superalloy powders shown in Table I, their respective solidus temperatures are about 1360° C. and 1225° C. respectively, which corresponds to a solidus differential between these high and low melt superalloy powders of about 135° C. However, it should be appreciated that the chemistries of the high and low melt superalloy powders may have other chemistries that produce the same base alloy or alternative base alloys, which have a similar differential between the solidus temperatures of the high and low melt superalloy powders, and which achieve similar reductions in microcracking when used in the example LAAM process.

For example, the high melt superalloy powder may have a chemistry that achieves a solidus temperature between 1330° C. and 1450° C., alternatively between 1350° C. and 1430° C. Also, in such example embodiments, the low melt superalloy powder may have a chemistry that achieves a solidus temperature of between 1200° C. and 1370° C., or alternatively between 1210° C. and 1360° C. For these respective example ranges for use in the described LAAM process, the solidus temperature of the low melt superalloy powder is lower than the solidus temperature of the high melt superalloy powder by at least between 50° C.

In this example of a base alloy produced via the LAAM process and in the alternative example embodiments described herein for different base alloys, the solidus temperature of the low melt superalloy powder may be lower than the solidus temperature of the high melt superalloy powder between about 50° C. and about 220° C., alternatively about 70° C. and about 200° C., alternatively about 90° C. and about 170° C., alternatively between about 100° C. and about 160° C., alternatively between about 110° C. and about 150° C., alternatively between about 120° C. and about 140° C.

In example embodiments the liquidus temperature of the low melt superalloy powder may be above 1300° C. However, it should be appreciated that the low melt superalloy powder may have other chemistries that produce the same base alloy or alternative base alloys, which have a liquidus temperature greater than 1270° C., and alternatively greater than 1440° C.

Also, for example, the solidus temperature of the low melt superalloy powder illustrated in Table I (about 1225° C.), is believed to be lower than the grain boundary melting temperature of the base alloy illustrated in Table I (believed to be between 1260° C. and 1270° C.) by between 35° C. and 45° C. However, it should be appreciated that the high and low melt superalloy powders may have other chemistries that produce the same base alloy or alternative base alloys, which have a similar differential between the solidus temperatures of the low melt superalloy powder and the grain boundary melting temperature of the base alloy. In addition, it should be appreciated that different ratios between the high melt superalloy powder and the low melt superalloy powder by weight (besides the 80:20 ratio used for the base alloy in Table I) and/or different chemistries for the high and/or low melt superalloy powders, may produce different temperature differentials between the solidus temperature of the low melt superalloy powder and the grain boundary melting temperature of the resulting base alloy. For example, in example embodiments the low melt superalloy powder used in the described LAAM process may be lower than the grain boundary melting temperature of the resulting base alloy by between 10° C. and 150° C., alternatively between 10° C. and 100° C., alternatively between 10° C. and 70° C., alternatively between 10° C. and 50° C., alternatively between 20° C. and 50° C., alternatively between about 35° C. and 45° C.

The following examples (shown in Table III and Table IV) of high and low melt superalloy chemistries (when used to form a superalloy powder mixture in the described LAAM process) may be capable of achieving the reductions in microcracking that were illustrated in the sample block 302 shown in FIG. 3, for a base alloy that is similar to the CM 247 LC superalloy in chemistry and physical properties:

TABLE III

| High Melt Superalloy Example Chemistries | |
|---|---|
| Element | Wt % |
| Cr | about 7.7-about 18, for example 7.7-8.1, alternatively for example 12.0-16.0 |
| Co | about 10.6-about 11, for example 10.6-11.0 |
| Ti | 0-about about 2, for example 0-1.0, alternatively for example 0-0.5, alternatively for example 0-0.05, alternatively for example 0-0.005, alternatively for example 0 |
| Al | about 4.5-about 6.5, for example 5.5-6.5, alternatively for example 5.3-5.8 |
| W | about 10.6-about 11, for example 10.6-11.0 |
| Mo | about 0.3-about 0.55, for example 0.30-0.55 |
| Ta | 0-about 1, for example 0-0.05, alternativelyf or example 0 |
| C | about 0.05-about 0.08, for example 0.05-0.08 |
| Zr | 0-about 1, for example 0.008-0.014 |
| Hf | 0-about 0.05, for example 0.0-0.05 |
| Re | 0-about 0.05, for example 0.0-0.05 |
| Y and/or Ce | 0-about 0.1, for example 0.03-0.07, alternatively for example 0-0.005 |
| B | 0-about 0.04, for example 0.0-0.016, alternatively for example 0 |
| Ni and optional incidental elements and unavoidable impurities | Balance |

TABLE IV

Low Melt Superalloy Example Chemistries

| Element | Wt % |
|---|---|
| Cr | about 9.5-about 10.5, for example 9.50-10.5 |
| Co | about 2.9-about 3.4, for example 2.9-3.4 |
| Ti | 0-about 5, for example 0-2.0, alternatively for example 0-1.0, alternatively for example 0-0.5, alternatively for example 0-0.05, alternatively for example 0-0.005, alternatively for example 0.5-5.0, alternatively for example 0 |
| Al | about 8-about 9, for example 8.0-9.0 |
| W | about 3.8-about 4.3, for example 3.8-4.3 |
| Mo | about 0.8-about 1.2, for example 0.8-1.2 |
| Ta | about 10-about 20, for example 12.0-18.0 |
| C | 0-about 0.08, for example 0-0.08 |
| Zr | 0-about 1, for example 0-0.05, alternatively for example 0.008-0.014 |
| Hf | about 3-about 12, for example 3.0-10.0, alternatively for example 7.0-9.0 |
| Re | 0-about 0.05, for example 0-0.05 |
| Y and/or Ce | 0-about 0.1, for example 0.03-0.07, alternatively for example 0-0.005 |
| B | 0-about 0.04, for example 0.0-0.016, alternatively for example 0 |
| Ni and optional incidental elements and unavoidable impurities | Balance |

It should be noted that for the high melt superalloy illustrated in Table III, the chromium content may range from about 7.7-about 18.0. However, for applications that desire the resulting part to have corrosion resistance corresponding to that of a part made from CM 247 LC superalloy, the chromium content for the high melt superalloy may for example be 7.7-8.1 in weight percent. For applications that desire a relatively higher corrosion resistance, the chromium content for the high melt superalloy may for example be 12.0-16.0 in weight percent.

In the example illustrated in Table I, yttrium (Y) was optionally included to increase the adhesion of the protective layer to the base alloy. However, as illustrated in Table III, in alternative embodiments cerium (Ce) may be used in place of the yttrium. In addition, alternative embodiments may include both yttrium and cerium.

In example embodiments, tantalum and/or hafnium and may be present in relatively greater amounts in the low melt superalloy powder than in the high melt superalloy powder to serve as a melting point depressant, but also in sufficient percentages in each powder to enable the final base alloy to have a composition similar to CM 247 LC or whichever other superalloy is desired to be produced from the LAAM process. For example, the high melt superalloy powder may include less than half the content by weight percent of tantalum compared to that in the low melt superalloy powder. Similarly, the high melt superalloy powder may include less than half the content by weight percent of hafnium compared to that in the low melt superalloy powder. Also for example, the high melt superalloy powder may include by weight at maximum 4.5% tantalum, alternatively at maximum 4.0% tantalum, alternatively less than 3.5% tantalum, alternatively less than 1.9% tantalum, alternatively at maximum 1.0% tantalum, alternatively at maximum about 0.05% tantalum, alternatively 0% tantalum.

It should be appreciated that example embodiments of the superalloy chemistries described and claimed throughout this application may include one or more optional incidental elements and/or unavoidable impurities. In some example embodiments the amount by weight of the total of any optional incidental elements may be between 0% and 1.5%. In further examples, the optional incidental elements may include one or more of the following in the indicated maximum amounts in weight % or ppm according to Table V:

TABLE V

Optional Incidental Elements

| Element | Wt % or ppm (max) |
|---|---|
| S | 30 ppm |
| Nb | 1.5% |
| Mn | 0.6% |
| Fe | 0.05% |
| Si | 0.30% |
| P | 50 ppm |
| Mg | 50 ppm |
| Cu | 0.01% |
| N | 60 ppm |
| O | 250 ppm |
| Ag | 1 ppm |
| As | 5 ppm |
| Bi | 0.1 ppm |
| Cd | 2 ppm |
| Ga | 25 ppm |
| In | 0.2 ppm |
| Pb | 2 ppm |
| Sb | 2 ppm |
| Se | 1 ppm |
| Sn | 10 ppm |
| Te | 0.1 ppm |
| Tl | 0.2 ppm |
| Zn | 5 ppm |
| V | 1.5% |

Also, in some example embodiments the amount by weight of the total of any unavoidable impurity elements may be between 0% and 0.01%. In further examples, unavoidable impurities may typically be within the maximum amounts listed in Table V for these respective elements and for any other element that maximum may be about 0.001 in weight %. However, it should be appreciated that in further embodiments, one or more of such optional incidental elements and/or unavoidable impurities may exceed these described ranges provided that the such optional incidental elements and/or unavoidable impurities do not interfere with the ability of the described LAAM process to produce additive portions with material properties after heat treatment (e.g., tensile strength, creep resistance) that meet the requirements for gas turbine hot gas path parts or other high temperature applications and are usable to replace corresponding parts made of a CM 247 LC superalloy or other difficult-to-weld superalloys via casting processes.

In example embodiments of this described LAAM process, the ratio of high melt to low melt superalloy powders in the superalloy powder mixture by weight may range between about 95:05 and about 51:49; alternatively between about 90:10 and about 60:40; alternatively between about 90:10 and about 70:30; alternatively between about 85:15 and about 75:25; alternatively between about 78:22 and about 82:18; alternatively about 80:20; and alternatively between about 94:06 and about 76:24. It should also be appreciated that in some embodiments, the superalloy powder mixture may comprise additional powders (such as an intermediate melt superalloy powder, which is described in more detail subsequently). However, in at least some example embodiments, at least 51% by weight of the additive portion may be formed from the high melt superalloy powder, and at least 5% by weight of the additive portion may be formed from the low melt superalloy powder. In further examples, at least 70% by weight, alternatively at least 80% by weight, alternatively at least 90% by weight, alternatively at least 95% by weight, alternatively at least 99% by weight, alternatively 100% by weight, of the additive portion may be comprised of the high and low melt superalloy powders.

Table VI illustrates example chemistries for a superalloy powder mixture and its resulting base alloy that may be produced for/by the described LAAM process, using the example high melt superalloy powder and the example low melt superalloy powder illustrated in Table III and Table IV in ratios that range from 90:10 to 70:30 by weight between the high and low melt superalloy powders. In some examples of a superalloy powder mixture, the inventors have discovered that a tantalum content by weight above 6.2% in the base alloy of the resulting additive portion may experience re-melting during heat treatment which causes an increase in the amount or size of ports and/or cracks in the additive portion. Thus, in some examples of the LAAM process, the chemistries of the high and/or low superalloy powders and/or their ratios in the superalloy powder mixture may be configured such that the resulting amount of tantalum in the base alloy is no more than 6.2% by weight.

TABLE VI

Base alloy/Superalloy Mixture Example Chemistries

| Element | Wt % |
| --- | --- |
| Cr | about 7.8-about 17.3, for example 7.8-8.8, alternatively for example 11.7-15.5 |
| Co | about 8.7-about 10.2, for example 8.7-10.2 |
| Ti | 0-about 2.9, for example 0-2.0, alternatively for example 0-0.5, alternatively for example 0-0.05, alternatively for example 0-0.005, alternatively for example 0.5-2.9, , alternatively for example 0 |
| Al | about 4.8-about 7.3, for example 4.8-7.3 |
| W | about 9-about 10.3, for example 9.0-10.3 |
| Mo | about 0.35-about 0.75, for example 0.35-0.75 |
| Ta | about 1-about 6.7, for example 1.0-6.2 |
| C | 0-about 0.12, for example 0.04-0.08 |
| Zr | 0-about 1, for example 0-0.025 |
| Hf | about 0.3-about 3.6, for example 0.3-2.0 |
| Re | 0-about 0.05, for example 0-0.05 |
| Y and/or Ce | 0-about 0.1, for example 0.03-0.07 |
| B | 0-about 0.04, for example 0.0-0.016, alternatively for example 0 |
| Ni and optional incidental elements and unavoidable impurities | Balance |

Figure 8:
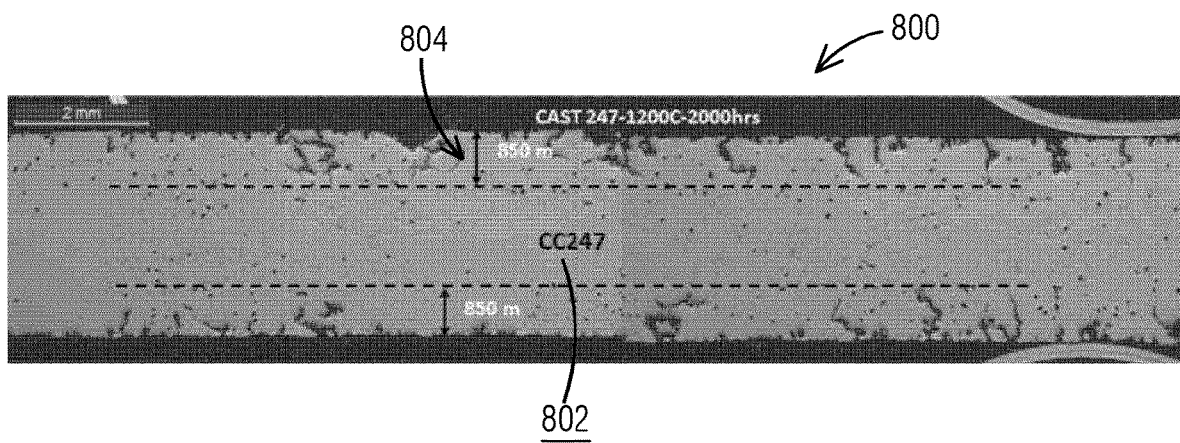
FIG. 8 illustrates an image of a cross-section of a sample block cast from a CM 247 LC superalloy after oxidation testing.
Figure 9:
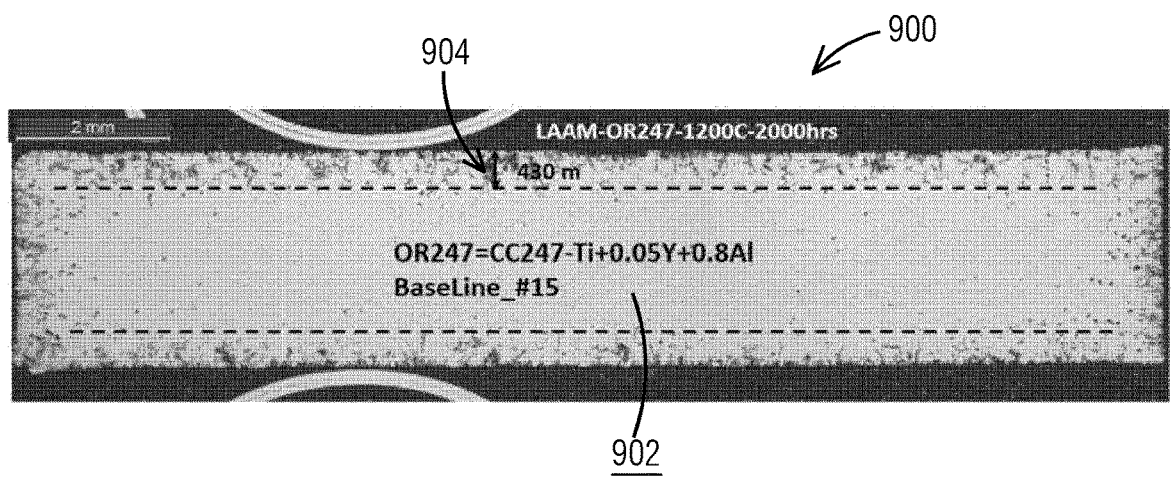
FIG. 9 illustrates an image of a cross-section of a sample block made via the example LAAM process after oxidation testing.

As discussed previously the example chemistries shown in Table I were configured to produce a base alloy chemistry for the additive portion similar to CM 247 LC superalloy but with enhanced oxidation resistance by removing all or most of the titanium, increasing aluminum, and adding a small amount of yttrium. FIG. 8 and FIG. 9 illustrate the enhanced oxidation resistance achieved by this chemistry.

For example, FIG. 8 illustrates an image 800 of a cross-section of a sample block 802 cast from CM 247 LC superalloy after oxidation testing, which has the chemistry shown in Table II. This cast CM 247 sample block 802 was maintained at a temperature of about 1200° C. for about 2000 hours. Extensive oxidation degradation of the outer surfaces of the block occurred to a depth 804 of about 850 µm.

FIG. 9 illustrates an image 900 of a cross-section of a sample block 602 produced via the example LAAM process after oxidation testing. The LAAM sample block 902 was generated in the same manner as the LAAM sample block 302 using a superalloy powder mixture having an 80:20 ratio by weight of the low and high melt superalloy powders with the respective chemistries shown in Table I. Similar to the cast CM 247 LC sample block 802, the LAAM sample block 902 was maintained at a temperature of about 1200° C. for about 2000 hours. Degradation of the outer surfaces of the block also occurred. However, in contrast to that shown for the casted CM 247 sample block 802, the oxidation degradation only occurred to a depth 904 of about 480 µm, which illustrates a substantially improved resistance to oxidation for high temperature applications for the LAAM sample block 902.

Figure 10:
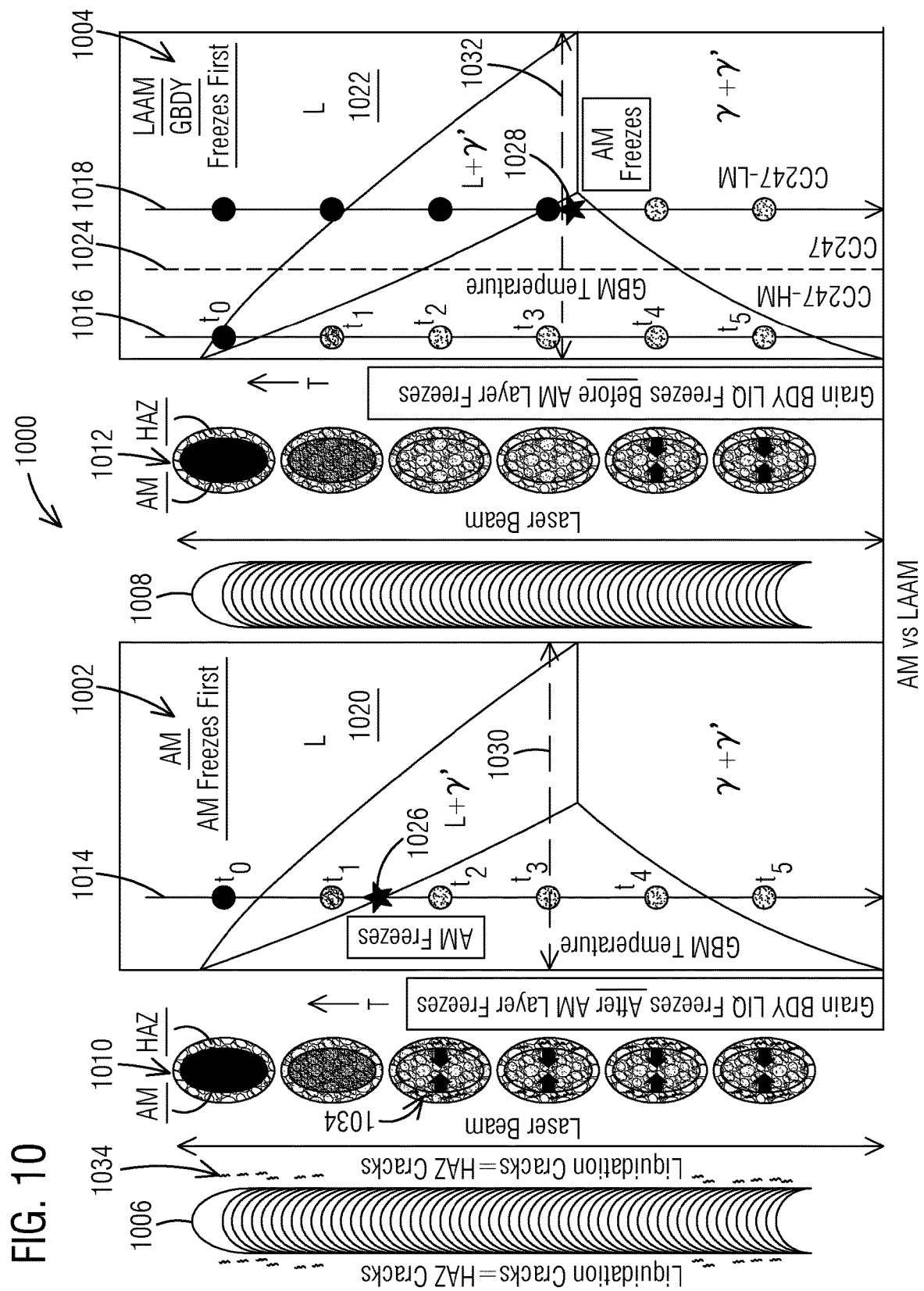
FIG. 10 illustrates a schematic view of a possible theory as to how the described LAAM process produces less cracks during an additive manufacturing process compared to an AM process using a conventional superalloy powder.

FIG. 10 illustrates a schematic view 1000 of a possible theory as to how the described LAAM process produces less cracks during an AM process compared to conventional methods of AM. The left-half side illustrates a conventional AM process 1002 involving a single difficult-to-weld superalloy powder (such as CM 247 LC superalloy). The right-hand side illustrates the LAAM process 1004. Each example shows a respective layer 1006, 1008 being deposited (and melted and cooled to a solid) in time along the vertical axis. The lower portions of the layers 1006, 1008 are older in time and have solidified, while the upper portions of the layers 1006, 1008 are newly melted.

To help illustrate the different phases/states of these layers 1006, 1008 over time, FIG. 10 shows schematic snapshot views 1010, 1012 (in oval shaped icons) at different points in time and temperatures of the layers (labeled $t_0$ to $t_5$). For example, the top snapshot views at temperature $t_0$ (i.e., the top ovals) show the newest portion of the deposited layer in a melted state (just as or after it was melted by a laser beam). The snapshot views at temperature $t_1$ (i.e., the second from the top ovals), show the portion of the layer after it has started to cool (because the laser beam has already moved away therefrom). Further downward, snapshot views at temperatures $t_2$ to $t_5$ depict the layers when they were deposited earlier in time and have further cooled, with the oldest snapshot view shown at temperature $t_5$ (i.e., the bottom oval) illustrating a fully solidified portion of each layer.

FIG. 10 also depicts three vertical lines 1014, 1016, 1018 that illustrate the possible phases/states of several superalloys at these points in time and temperature ($t_0$ to $t_5$) from which these layers 1006, 1008 are made. These lines 1014, 1016, 1018 are shown overlaid over phase diagrams 1020, 1022, that generally represent the various phases/states of liquid (L), and gamma ($\gamma$), and gamma prime ($\gamma'$) precipitation with a vertical axis corresponding to temperature and a horizontal axis corresponding to aluminum content by weight. For the conventional AM process 1002, line 1014 depicts the phases at temperatures $t_0$ to $t_5$ for a single difficult-to-weld superalloy powder (such as the CM 247 LC superalloy) positioned on the phase diagram 1020 based on its high aluminum content.

For the LAAM process 1004, line 1016 depicts the phases at temperatures $t_0$ to $t_5$ for the high melt superalloy (used to make the layer 1008) positioned on the phase diagram 1022 based on its aluminum content. Similarly, line 1018 depicts the phases at temperatures $t_0$ to $t_5$ for the low melt superalloy (used to make the layer 1008) positioned on the phase diagram 1022 based on its aluminum content. In addition, broken line 1024 depicts the phases/states at temperatures $t_0$ to $t_5$ for the base alloy (of which layer 1008 is comprised based on a mixture of the high and low melt superalloys) positioned on the phase diagram 1022 based on its aluminum content.

It should be noted that the compositions of the high and low melt superalloy powders may be selected such that the LAAM process produces a deposited base alloy layer 1008 that is similar in composition to the deposited single difficult-to-weld superalloy layer 1006 (such as the CM 247 LC superalloy), but without or at least with substantially less microcracking in the layer 1008 and its underlaying layer/substrate. Thus, the relative horizontal location of the line 1024 for the base alloy created via the LAAM process is depicted in FIG. 10, as about corresponding to the horizontal location of the line 1014 for the single difficult-to-weld superalloy, with respect to their relative locations on the respective phase diagrams 1020, 1022 (due to their somewhat similar aluminum contents).

It should also be noted that that the star 1026 on the line 1014 corresponds to the solidus temperature about when the single difficult-to-weld superalloy freezes, which occurs between temperatures $t_1$ and $t_2$, but which is well above the temperature 1030 at which the liquated grain boundary freezes in the difficult-to-weld superalloy. Similarly, the star 1028 on the line 1018 corresponds to the solidus temperature about when the low melt superalloy freezes, which occurs below the temperature 1032 at which the liquated grain boundary freezes in the deposited layer 1008 of the base alloy.

In view of these features, an example LAAM process may carry out one or more of the following metallurgical functions prior to heat treatment of the additive portion:
- the low melt superalloy fills solidification cracks (central cracks) of the deposited layer in order to reduce solidification cracking;
- The low melt superalloy enables the deposited layer to exert less strain on the heat affected zone (HAZ) previous layer grain boundaries (which are liquified when the current layer is deposited) in order to reduce grain boundary cracking; and/or
- the low melt superalloy solidifies after the liquified grain boundaries of the HAZ solidify and gain strength, in order to reduce HAZ liquification cracking.
- where such reductions in microcracking are relative to the amount of microcracking that would have occurred as the additive portion cools to room temperature had the AM process been carried out by building up the deposited layers using only a base alloy superalloy powder (or only a high melt superalloy powder or only a low melt superalloy powder) without using the described superalloy powder mixture.

As is known in the art, grain boundary cracking corresponds to cracking of the previous AM layer grain boundaries due to grain boundary liquation. Solidification cracking corresponds to cracking in the current AM layer due to segregation of low melting point elements into the final liquid to solidify. Further, HAZ corresponds to the area or zone of the substrate and/or the previously deposited layer that experiences liquification of grain boundaries as the laser beam (or other energy beam) melts and deposits a new layer adjacent thereto (but not directly thereon). HAZ cracking occurs at these melted grain boundaries in the HAZ.

FIG. 10 schematically illustrates this reduction in microcracking. For example, examples of HAZ liquification cracking 1034 are depicted along the single difficult-to-weld superalloy layer 1006 which may typically occur at about temperatures $t_2$ to $t_5$ for the conventional AM process 1002. In contrast, FIG. 10 illustrates the absence of such HAZ liquification cracking along layer 1008 and in its respective snapshot views 1012 as a result of carrying out the example LAAM process 1004.

It should be understood that the high and low melt superalloy powder compositions described herein are not intended to be limited to only these examples, but may have different compositions depending on the desired chemistry or properties for the base alloy. For example, in order to produce a superalloy component (or portion thereof) having a base alloy similar to or corresponding to a particular type or brand of difficult-to-weld superalloy with reduced microcracking during AM, a manufacturer of a superalloy component may selectively split the desired base alloy chemistries into the described high and low melt superalloy powders in particular ratios having respectively different solidus temperatures are capable of carrying out one or more of the metallurgical functions described herein to reduce microcracking. For example, the low melt superalloy for such alternative embodiments may be configured with elements that when combined in a superalloy powder mixed with the high melt superalloy powder in a superalloy powder mixture used in an LAAM process, produce the characteristics described previously so that the low melt superalloy: fills the solidification cracks of the deposited layer so as to produce a substantially solidification crack free layer; prevents the layer from exerting strain (and therefore prevent grain boundary cracking) on the HAZ layer grain boundaries; and/or solidifies after the liquified grain boundaries of the HAZ, solidify and gain strength, in order to prevent HAZ liquification cracking.

In general, a superalloy powder mixture of the high and low melt superalloys for use with additively manufacturing a superalloy part via the described LAAM process may include by weight greater than 40% nickel, at least 1% tantalum, and greater than 4% in total of aluminum and optional titanium content, where each of the high and low melt superalloy powders include by weight at least 40% nickel and at least 1.5% aluminum. In particular, such superalloy powder mixtures may comprise by weight of about 4% to about 23% chromium, about 4% to about 20% cobalt, 0% to about 8% titanium, about 1.5% to about 8% aluminum, 0% to about 11% tungsten, 0% to about 4% molybdenum, about 1% to about 13% tantalum, 0% to about 0.2% carbon, 0% to about 1% zirconium, 0% to about 4% hafnium, 0% to about 4% rhenium, 0% to about 0.1% yttrium and/or cerium, 0% to about 0.04% boron, 0% to about 2% niobium and balance nickel as their primary components. It should also be appreciated that such superalloys may include additional components such as 0% to 1.5% option incidental elements and/or unavoidable impurities such as listed and described with respect to Table V.

In particular, the described LAAM process may be carried out with superalloy powder mixtures configured to produce base alloys corresponding to or similar to commercially available superalloys with chemistries such as a CM 247 LC superalloy discussed previously, as well as the example superalloys listed in the following Table VII (as well as other superalloys).

TABLE VII

Superalloys including Tantalum (Wt % Element)

| Alloy | Cr | Co | Ti | Al | W | Mo | Ta | C | Zr | Hf | Re | B | Nb | Ni |
|---|---|---|---|---|---|---|---|---|---|---|---|---|---|---|
| René N5 | 7 | 8 | | 6.2 | 5 | 2 | 7 | 0.05 | | 0.2 | 3 | 0.004 | | bal. |
| René 142 | 6.8 | 12 | | 6.1 | 4.9 | 1.5 | 6.4 | 0.12 | 0.02 | 1.5 | 2.8 | 0.015 | | bal. |
| PWA 1484 | 5 | 10 | | 5.6 | 6 | 2 | 9 | | | 0.1 | 3 | | | bal. |
| PWA 1480 | 10 | 5 | 1.5 | 5 | 4 | | 12 | 0.05 | | | | 0 | | bal. |
| PWA 1483 | 12.8 | 9 | 4 | 3.6 | 3.8 | 1.9 | 4 | 0.07 | | | | 0.02 | | bal. |
| Inconel 738 | 16 | 8.5 | 3.4 | 3.4 | 2.6 | 1.7 | 1.7 | 0.18 | 0.05 | | | 0.01 | 0.9 | bal. |
| Inconel 792 | 12.4 | 9 | 4 | 3.4 | 3.8 | 1.9 | 3.9 | 0.12 | 0.05 | | | | | bal. |
| Inconel 939 | 22.5 | 19 | 3.7 | 1.9 | 2 | | 1.4 | 0.15 | 0.09 | | | 0.01 | 1 | bal. |
| Inconel 6203 | 22 | 19 | 3.5 | 2.3 | 2 | | 1.1 | 0.15 | 0.1 | 0.8 | | 0.01 | 0.8 | bal. |
| René N4 | 9 | 8 | 4.2 | 3.7 | 6 | 2 | 4 | 0.05 | | | | 0.004 | 0.5 | bal. |
| CMSX-6 | 10 | 5 | 4.7 | 4.8 | | 3 | 2 | | | 0.1 | | | | bal. |
| CMSX-11C | 14.9 | 3 | 4.2 | 3.4 | 4.5 | 0.4 | 5 | | | 0.04 | | | 0.1 | bal. |
| GTD 111 | 14 | 9.5 | 4.9 | 3 | 3.8 | 1.5 | 2.8 | 0.1 | | | | 0.01 | | bal. |
| GTD444 | 9.8 | 7.5 | 3.5 | 4.2 | 6 | 1.5 | 4.8 | | | 0.15 | | | 0.5 | bal. |

As with prior examples of the LAAM process, to produce base alloys with such chemistries (or other desired superalloy chemistries), the superalloy powder mixture may include a high melt superalloy powder having less than half the content by weight percent of tantalum compared to the content by weight percent of tantalum in the low melt superalloy powder. In such examples, the low melt superalloy powder may include by weight 5% to 22% tantalum, alternatively for example 10% to 22% tantalum, alternatively for example 12% to 20% tantalum, and alternatively for example 12% to 18% tantalum, while the high melt superalloy powder (as discussed previously) may include by weight at maximum 4.5% tantalum, alternatively at maximum 4.0% tantalum, alternatively less than 3.5% tantalum, alternatively less than 1.9% tantalum, alternatively at maximum 1.0% tantalum, alternatively at maximum 0.05% tantalum, and alternatively 0% tantalum.

In addition, as discussed previously, the chemistries of the high and/or low melt superalloy powders and/or their ratios in the superalloy powder mixture may be further configured such that the resulting amount of tantalum in the base alloy is no more than 6.2% by weight. However, it should be appreciated that in alternative embodiments the low melt superalloy powder may be configured with more than 6.2% by weight of tantalum, for example, where other elements in the superalloy powder mixture prevent issues related to re-melting during heat treatment.

It should be appreciated that as discussed in prior examples, the high and/or low melt superalloy powders may include by weight for example 0% to 0.1% yttrium and/or cerium, alternatively for example 0.03% to 0.07% yttrium and/or cerium. Also for example, the high and/or low melt superalloy powders may include by weight for example 0% to 0.04% boron and 0% to 0.2% carbon by weight.

It should also be understood that one or more other elements other than tantalum (such as chromium, cobalt, titanium, aluminum, tungsten, molybdenum, carbon, zirconium, hafnium, rhenium, yttrium, cerium, boron, niobium, nickel, or other elements) may be the same or substantially the same in each of the high melt superalloy powder and the low melt superalloy powder used to produce a desired superalloy base alloy via the described LAAM process. However, as with the prior examples of high and low melt superalloy powders (e.g., shown in Table III, Table IV) one or more of each of the other respective elements (besides tantalum) in these respective powders may be respectively different in weight percent to achieve respectively different solidus temperatures that are capable of carrying out one or more of the metallurgical functions described herein to reduce microcracking. For example, the amount of chromium, aluminum, and molybdenum may be 0% to 80% less (alternatively 15% to 70% less) by weight percent in the low melt superalloy powder compared to the high melt superalloy powder. Also for example, the amount of cobalt and tungsten may be 0% to 80% less (alternatively 50% to 75% less) by weight percent in the high melt superalloy powder compared to the low melt superalloy powder.

As discussed previously the example LAAM process may also be carried out to manufacture or repair a part made from a superalloy that includes titanium (e.g., 1% to 5% by weight). As listed in Table VII, examples of commercially available superalloys that comprise titanium include the PWA1480, PWA1483, Inconel-738, Inconel-792, Inconel-939, Inconel 6203, Rene N4, CMSX6, CMSX11C, GTD111, and GTD444 branded superalloys. Because these example superalloys include a substantial amount of titanium, the titanium content in weight percent may be configured to be higher in the low melt superalloy powder than in the high melt superalloy powder to assist in providing the low melt superalloy powder with a solidus temperature that is sufficiently lower than the high melt superalloy powder to carry out the described LAAM process and produce less or virtual no microcracking.

For example, superalloy powder mixtures for use with additively manufacturing a base alloy corresponding to or substantially similar to these commercially available superalloys (with greater than 1% titanium by weight) may be configured such that the low melt superalloy powder includes at least 7% by weight of titanium (and alternately greater than 15% titanium by weight), and the high melt superalloy powder includes less than half the content by weight percent of titanium compared to the content by weight percent of titanium in the low melt superalloy powder. For example, the low melt superalloy powder may include by weight for example 7% to 25% titanium, alternately for example 15% to 25% titanium, while the high melt superalloy powder includes by weight for example less than 2% titanium, alternatively for example 0% to 0.05% titanium, and alternatively for example 0% titanium.

The example LAAM process may also be carried out to manufacture or repair a part made from a superalloy having a substantial amount of hafnium (e.g., up to 4% by weight) such as the example base alloy having the chemistry listed in Table VI and the chemistry corresponding to the CM 247 LC superalloy listed in Table II. Because these example superalloys include a substantial amount of hafnium, the hafnium content in weight percent may be configured to be higher in the low melt superalloy powder than in the high melt superalloy powder to assist in providing the low melt superalloy powder with a solidus temperature that is sufficiently lower than the high melt superalloy powder to carry out the described LAAM process and produce less or virtual no microcracking.

For example, superalloy powder mixtures for use with additively manufacturing a base alloy having up to 4% by weight of hafnium, may be configured such that the low melt superalloy powder includes by weight at least 0.5% of hafnium (such as for example 3% to 12% hafnium), and the high melt superalloy powder includes less than half the content by weight percent of hafnium compared to the content by weight percent of hafnium in the low melt superalloy powder. For example, the high melt superalloy powder may include by weight less than 1.7% hafnium, alternatively for example 0% to 0.05% hafnium, and alternatively for example 0% hafnium.

In addition, the example LAAM process may also be carried out to manufacture or repair a difficult-to-weld superalloy that includes greater than 2% by weight of rhenium, a moderate to high amount of aluminum (1.5% to 8% by weight), a relatively high amount of tantalum (greater than 5% by weight) and a low amount of titanium (0% to 1% by weight). In particular, alternative embodiments of the described LAAM process may be carried out with superalloy powder mixtures configured to produce base alloys corresponding to or similar to commercially available difficult-to-weld superalloys such as René 142, René N5, and PWA 1484 branded superalloys listed in Table VII, which are known to have excellent oxidation and creep resistance in gas turbine applications. In particular, a superalloy mixture comprised of the example high melt superalloy powder shown in Table VIII and low melt superalloy powder shown in Table IX may be used to produce a part via the LAAM process, having a resulting base alloy similar to such superalloys with greater than 2% rhenium content by weight.

TABLE VIII

A High Melt Superalloy Powder Example

| Element | Wt % |
|---|---|
| Cr | about 5-about 7.3, for example 6.0-7.3 |
| Co | about 7-about 13, for example 11.0-13.0, alternately for example 7.0-9.0 |
| Ti | 0-about 0.05, for example 0 |
| Al | about 5.5-about 6.5, for example 5.8-6.5 |
| W | about 4.7-about 6, for example 4.7-5.2 |
| Mo | about 1.2-about 2.2, for example 1.2-2.2 |
| Ta | 0-about 4.5, for example 0-4.0, alternatively for example less than 3.5, alternatively for example less than 1.9, alternatively for example 0-1.0, alternatively for example 0-0.05 |
| C | 0-about 0.15, for example 0.8-0.15 |
| Zr | 0-about 1, for example 0-0.05 |
| Hf | 0-about 1.7, for example 0-1.7 |
| Re | about 2-about 4.2, for example 2.0-4.2 |
| Y and/or Ce | 0-about 0.1, for example 0.03-0.07 |

TABLE VIII-continued

A High Melt Superalloy Powder Example

| Element | Wt % |
|---|---|
| B | 0-about 0.04, for example 0.0-0.016 |
| Ni and optional incidental elements and unavoidable impurities | Balance |

TABLE IX

A Low Melt Superalloy Powder Example:

| Element | Wt % |
|---|---|
| Cr | about 9.5-about 10.5, for example 9.5-10.5 |
| Co | about 2.9-about 3.4, for example 2.9-3.4 |
| Ti | 0-about 5, for example 0-2.0, alternatively for example 0-1.0, alternatively for example 0-0.5, alternatively for example 0-0.05, alternatively for example 0-0.005, alternatively for example 0.5-5.0 |
| Al | about 7-about 9, for example 7.0-9.0 |
| W | about 3.8-about 4.3, for example 3.8-4.3 |
| Mo | about 0.8-about 1.2, for example 0.8-1.2 |
| Ta | about 12-about 22, for example 12.0-22.0 |
| C | 0-about 0.08, for example 0 |
| Zr | 0-about 1, for example 0.008-0.014 |
| Hf | about 0-about 12, for example 0.0-12.0 |
| Re | 0-about 3.2, for example 0 |
| Y and/or Ce | 0-about 0.1, for example 0.03-0.07 |
| B | 0-about 0.04, for example 0.0-0.016 |
| Ni and optional incidental elements and un-avoidable impurities | Balance. |

However, as discussed previously it should be appreciated that alternative embodiments may include alternative chemistries for these high and low melt superalloy powders depending on the desired content for the resulting base alloy.

In an alternative embodiment, one or more aspects of the LAAM process may be carried out to produce a component made out of a base alloy using a superalloy powder mixture that includes a relatively high amount of titanium (1% to 5% by weight), in addition to a low to high amount of aluminum (2% to 5% by weight), but zero or a low amount of tantalum (0% to 0.5% by weight). In particular, alternative embodiments may be carried out with superalloy powder mixtures configured to produce base alloys corresponding to or similar to commercially available superalloy with chemistries such as those shown in Table X for René 80, Inconel 100, Udiemt 710, Udiemt 720 branded superalloys (as well as other superalloys that include zero or low amounts of tantalum).

TABLE X

Superalloys without Tantalum (Wt % Element)

| Alloy | Cr | Co | Ti | Al | W | Mo | Ta | C | Zr | B | V | Fe | Ni |
|---|---|---|---|---|---|---|---|---|---|---|---|---|---|
| René 80 | 14 | 9.5 | 5 | 3 | 4 | 4 | | 0.17 | 0.03 | 0.02 | | | bal. |
| Inconel 100 | 10 | 15 | 4.7 | 5.5 | | 3 | | 0.18 | 0.06 | | 1 | | bal. |
| Udiemt-710 | 18 | 15 | 5 | 2.5 | 1.5 | 3 | | 0.06 | | 0.02 | | 0.5 | bal. |
| Udiemt-720 | 18 | 15 | 5 | 2.5 | 1.25 | 3 | | 0.03 | 0.03 | 0.03 | | | bal. |

To produce parts with a base alloy corresponding to or similar to these superalloys, the titanium content in weight percent may be configured (as described previously) to be higher in the low melt superalloy powder than in the high melt superalloy powder to assist in providing the low melt superalloy powder with a solidus temperature that is sufficiently lower than the high melt superalloy powder to improve physical characteristics of the base alloy when carrying out an AM process.

It should also be understood, that in example embodiments of AM processes or welding processes described herein, each of the particles included in a powder described herein may have generally the same chemistry (e.g., consistent with in the ranges of elements by weight described herein). However, in some example embodiments, it should be appreciated that the chemistries of each particle in a powder may vary as long as the chemistry of the powder overall corresponds to the chemistry described herein for that particular powder. Thus, it should also be appreciated that in some examples one or both of the high and low melt superalloy powders may themselves be comprised of more than one type of powder mixture.

For example, the high melt superalloy powder may be comprised of more than one high melt powder, each having different chemistries, but in combination corresponding to an example of a high melt superalloy powder described herein. Further, the low melt superalloy powder may be comprised of more than one low melt powder, each having different chemistries, but in combination correspond to an example of a low melt superalloy powder described herein. In example embodiments, individual elements or multiple elements may be similarly included in different particles that form the particular powder described herein, provided such different particles do not interfere with the ability of the LAAM process to produce lower amounts of cracks and pores as described in the example embodiments. However, it should also be appreciated that in a typical example, the high melt superalloy powder and the low melt superalloy powder are each comprised of particles in which all or substantially all of the particles therein have generally the same respective chemistries (with variances that are typical of conventional manufacturing process that produce powders that are intended to be comprised of the same alloy).

Further, in alternative embodiments, the superalloy powder mixture may include one or more intermediate melt superalloy powders, each having a solidus temperature between that of the solidus temperatures of the high and low melt superalloy powders, provided that the amounts of such intermediate melt superalloy powders do not interfere with the ability of the LAAM process to produce lower amounts of cracks and pores as described in the example embodiments. For example, the amount of such intermediate melt powders may be less than 30% by weight of the superalloy powder mixture (i.e., the portion of the base alloy/additive portion that is formed from the high and low melt superalloy powders is by weight at least 70%. Alternatively, embodiments may have different amounts by weight of the intermediate melt superalloy powder.

In example embodiments, such an intermediate melt superalloy powder may have a chemistry that includes all or portions of the elements described as being included in the base alloy, the high melt superalloy powder, and/or the low melt superalloy powder, with ranges by weight of elements that provide the intermediate melt superalloy powder with a solidus temperature between that of the solidus temperatures of the respective high and low melt superalloy powders.

Figure 11:
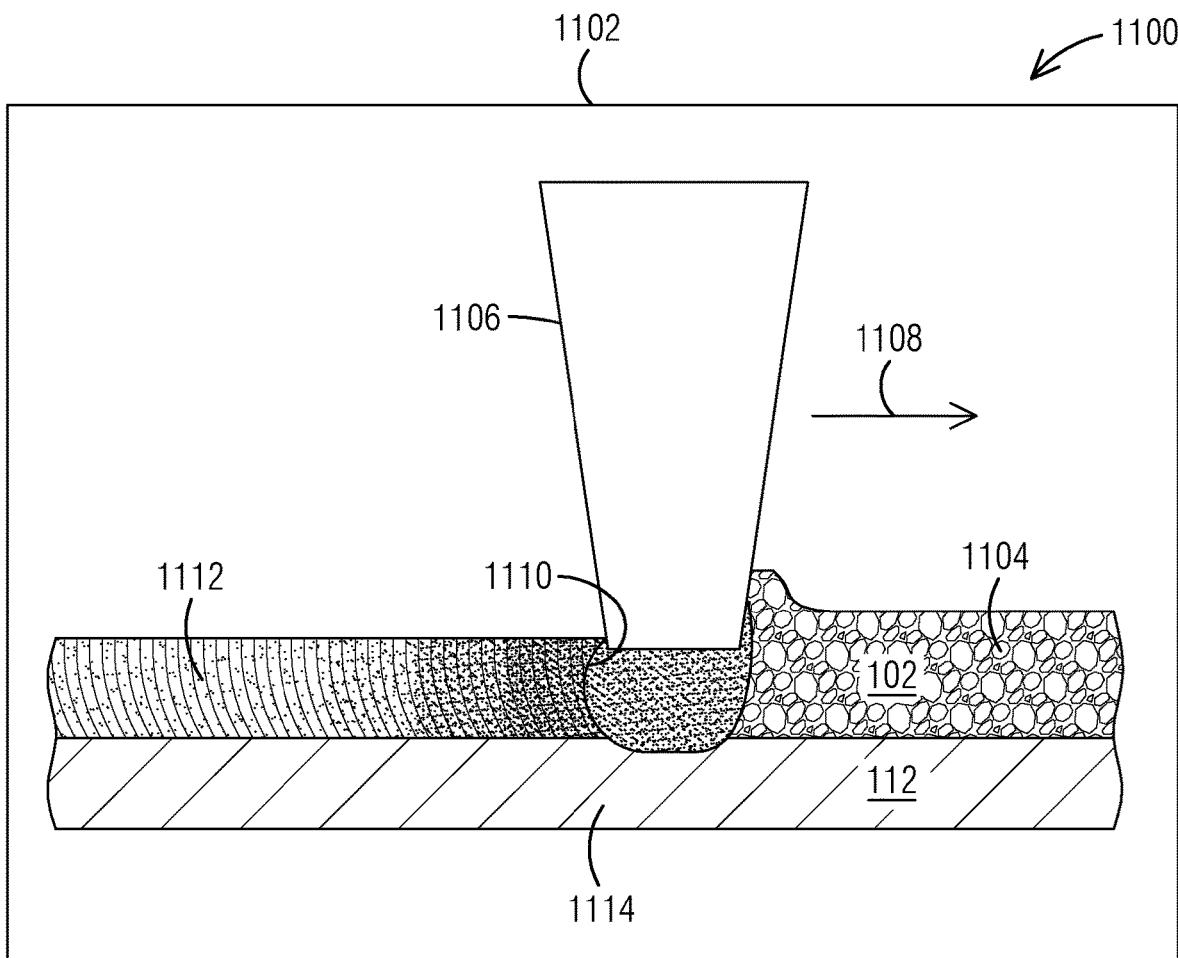
FIG. 11 illustrates a schematic view of the example LAAM process being carried out with an additive system corresponding to an SLM 3D printer.

Referring back to FIG. 1, as previously discussed the substrate 112 may correspond to a previously deposited layer created from the superalloy powder mixture 102. However, it should also be appreciated that the substrate 112 may correspond to a different type of superalloy and/or a preexisting component made of the same or a different type of superalloy (or some other metal that is not a superalloy). For example, FIG. 11 shows a schematic view 1100 of the process described in FIG. 1 being carried out with an additive system 100 corresponding to an SLM 3D printer 1102. In this example, the substrate 112 corresponds to a preexisting superalloy component 1114 mounted in the 3D printer. The 3D printer is shown at a point in time where a powder layer 1104 of the superalloy powder mixture 102 has been previously deposited on the superalloy component 1114. A laser beam 1106 of the 3D-printer is shown melting the deposited powder layer 1104 along a tool path 1108, which melted layer 1110 eventually cools as a solid layer 1112 in fused connection with the superalloy component 1114. This process may then be repeated to build-up additional solid layers 1112 of base alloy superalloy made from melting the superalloy powder mixture 102.

Figure 12:
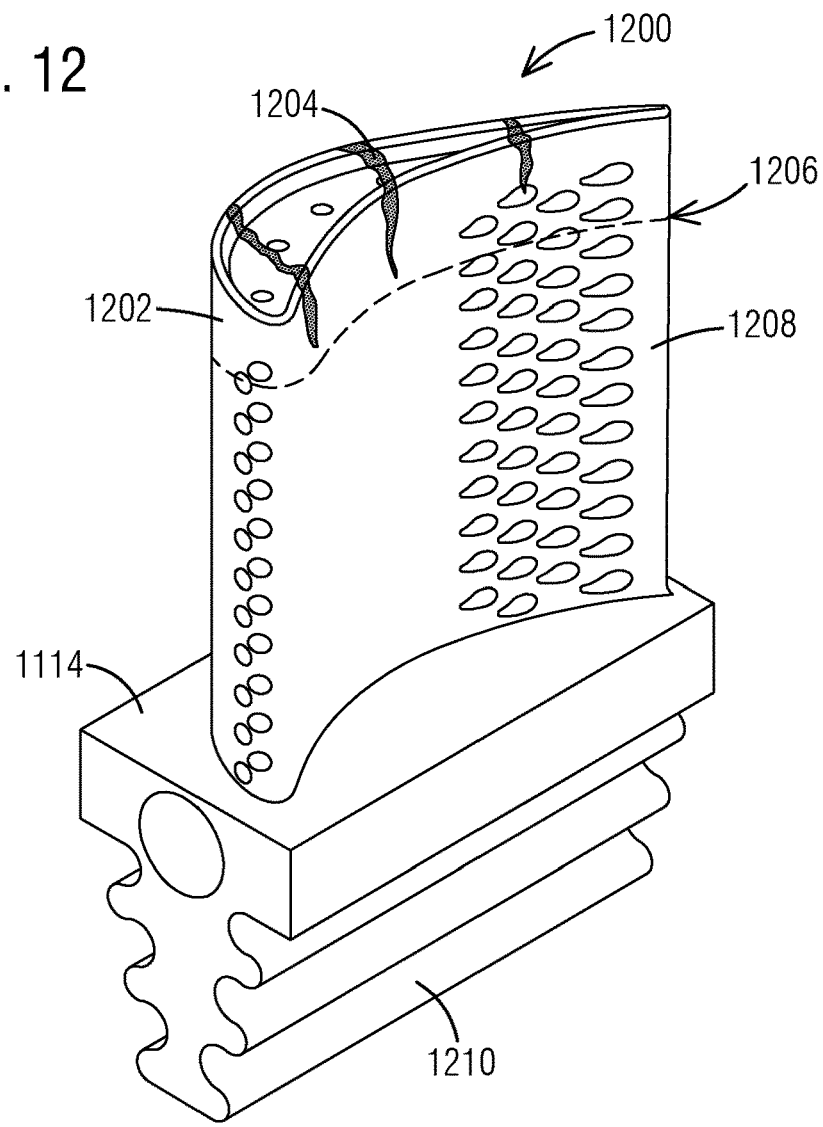
FIG. 12 illustrates a perspective view of a turbine blade made out of a conventional superalloy, which includes an upper tip portion having several cracks.

This described process shown in FIG. 11 may be used to repair damaged pre-existing superalloy components to correspond to refurbished superalloy components. For example, FIG. 12 illustrates a perspective view 1200 of a superalloy component 1114 in the form of a gas turbine blade made out of a conventional superalloy (e.g., CM 247 LC or another superalloy). This blade is depicted with an upper tip portion 1202 having several cracks 1204. It may also have oxidation damage. To repair this blade, the upper tip portion 1202 may be removed (e.g., cut off via EDM) at the broken line 1206 and the remining remaining portions 1208 (including the root 1210) of the superalloy component 1114 (without the upper tip portion 1202) may be mounted in a 3D printer. In this example, the newly created upper surface (at the location of the broken line 1206) of the remaining portions 1208, may correspond to the upper surface of the substrate 112 shown in FIG. 1 and the upper surface of the superalloy component 1114 shown in FIG. 11.

Figure 13:
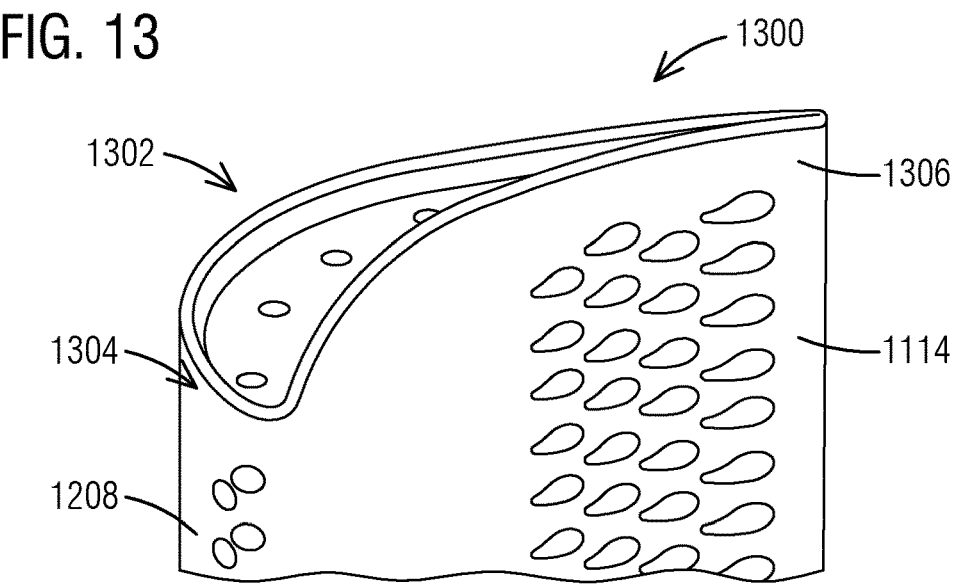
FIG. 13 illustrates a perspective view of the turbine blade depicted in FIG. 12 after being refurbished to include a new upper tip portion generated via the example LAAM process.

FIG. 13 illustrates a perspective view 1300 of the superalloy component 1114, showing the buildup of additional layers 1304 to form a refurbished blade 1302 with a replacement upper tip portion 1306. Such a replacement upper tip portion corresponds to a tip coupon. In this example the coupon is created and fused to the remaining portions 1208 of the superalloy component 1114 via the LAAM process. The superalloy material created by the described LAAM process for the replacement upper tip portion 1306 may be comprised of a different superalloy chemistry which exhibit operational properties that are superior to the original type of superalloy from which the removed upper tip portion 1202 was made (e.g., higher resistance to oxidation, corrosion, and thermal fatigue). For example, the superalloy component 1114 in the form of a gas turbine blade may be comprised of a superalloy that includes greater than 0.5% by weight of titanium, which may experience oxidation issues on its tip at high temperatures. Replacing such a tip with a tip coupon made out of a higher performance superalloy powder mixture and resulting base alloy with less titanium (e.g., by weight 0 to 0.5% titanium, alternately 0 to 0.05% titanium, and alternatively 0 to 0.005% titanium) or with no titanium via the described LAAM process may enable such a blade to achieve higher oxidation resistance. However, it should be appreciated that alternative embodiments of the superalloy powder mixture and resulting base alloy may have an amount of titanium corresponding to CM 247 alloy (0.6% to 0.9% as illustrated in Table II) or a higher titanium content (e.g., 0.5% to 2.9% by weight) for applications with lower oxidation resistance requirements. Such elevated amounts of titanium in the base alloy may be achieved by increasing the amount of titanium in the example low melt superalloy, such as up to about 5% titanium by weight.

Further, the 3D printer may be be configured to build up a replacement upper tip portion 1306 with a different design (e.g., different cooling holes or other cooling structures) that also enhance the operational properties of the refurbished blade 1302. In addition, in other examples, rather than refurbishing a blade or other superalloy component, the example LAAM process may be carried out on a newly fabricated (e.g., AM or casted) blade (having a root) or other components made out of a first type of superalloy (e.g., CM 247 LC superalloy) or other metal (e.g., titanium), which was fabricated (e.g., cast) without the upper tip portion. Thus, the LAAM process may be integrated into the production of new blades or other components that have upper tip portions made out of a different type of superalloy (or other metal) using the described superalloy powder mixture 102.

In further example embodiments, rather than building up the coupon on the previously existing superalloy component mounted within a 3D printer, the coupon may be generated separately in the 3D printer via the LAAM process on a build plate of the 3-D printer. Thus, the substrate 112 corresponds to the first and/or a previously layer of the coupon that was previously deposited and made from the superalloy powder mixture 102. In this further example, the coupon created via the LAAM process may be brazed to the preexisting superalloy component or other metal component to form the desired final shape of the part. For example, the replacement upper tip portion 1306 of a blade may be separately created in a 3D printer and then subsequently brazed to the body of the blade that includes the root. It should be understood that the term metal component as used herein is not intended to be limited to referring to non-superalloys, but should be construed broadly to corresponding to a component made out of one or more types of metals and/or alloys and/or superalloys, and/or base alloys.

In the previous examples of the LAAM process, the superalloy powder mixture was described as being comprised of a high melt superalloy powder and a low melt superalloy powder. However it may also be possible to carry out an AM method that produces an additive portion (usable in gas turbines or other high temperature applications) using a powder mixture comprising a high melt superalloy powder and a eutectic powder, where the eutectic powder has a much lower solidus temperature compared to the low melt superalloy powders described with respect to the LAAM process (e.g., the solidus temperature of the eutectic powder may be more than 220° C. below the solidus temperature of the high melt superalloy powder and the liquidus temperatures of the eutectic powder is below 1300° C.).

Unlike the LAAM process, in such an alternative method extensive amounts of solidification cracks and pores may be formed in the additive portion during its additive manufacture. However, during subsequent heat treatment, portions of the additive portion formed from the eutectic powder may have a sufficiently low solidus temperature that it is capable of at least partially liquefying and filling in solidification cracks and pores (referred to herein as crack healing) without degradation of the shape of the part (and without the need for a HIP operation).

This described crack healing AM process may share steps similar to the LAAM process as described with respect to FIG. 1, with the low melt superalloy powder being replaced with the described eutectic powder. The high melt superalloy powder may correspond to a high gamma prime superalloy such as the CM 247 LC, René 142, and N5 superalloys. The eutectic powder may be comprised predominantly of Ni—Cr—Ti or Ni—Cr—Ti—Zr or other eutectic powder with similar properties. The ratio of high melt powder to eutectic powder by weight for the superalloy powder mixture may range between about 94:06 and about 76:24, alternatively between about 94:06 and about 85:15.

In a first example of this crack healing AM process, the high melt superalloy powder and a Ni—Cr—Ti—Zr eutectic powder with the chemistries shown in Table XI were mixed together in about a 90:10 ratio by weight respectively, to form a superalloy powder mixture.

TABLE XI

Crack Healing AM Process Examples

| Element | High Melt Superalloy Powder (Wt %) | Low Melt Eutectic powder (Ni—Cr—Ti—Zr) (Wt %) |
| --- | --- | --- |
| Cr | 8.3 | 8.0 |
| Co | 9.3 | 0 |
| Ti | 0.8 | 7.0 |
| Al | 5.6 | 0 |
| W | 9.5 | 0 |
| Mo | 0.5 | 0 |
| Ta | 3.2 | 0 |
| C | 0.1 | 0 |
| Zr | 0 | 11.0 |
| Hf | 1.4 | 0 |
| Re | 0 | 0 |
| Y | 0 | 0 |
| B | 0 | 0 |
| Ni | Balance | Balance |

This superalloy powder mixture may be usable in this described crack healing AM process to produce parts having operational characteristics (e.g., in a gas turbine) similar to casted CM 247 LC. In this example, the liquidus temperature of the Ni—Cr—Ti—Zr eutectic powder is about 1225° C., which is below the liquidous temperature of the low melt superalloy powder described with respect to the LAAM process.

Figure 14:
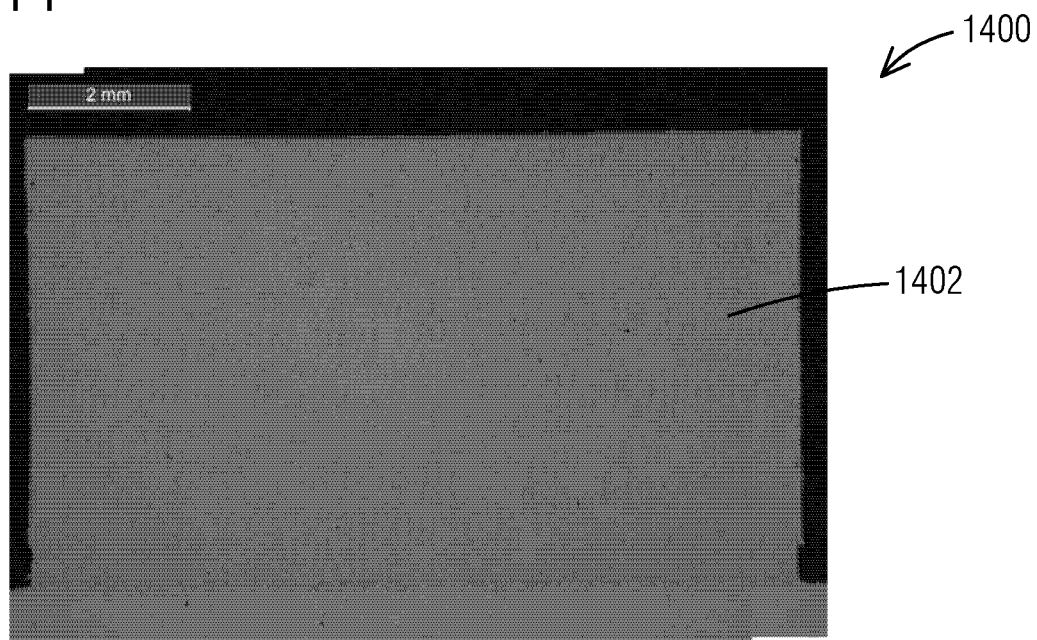
FIG. 14 illustrates an image of a cross-section of a sample block additively manufactured via an example crack healing AM process.

FIG. 14 shows an image 1400 of a cross-sectional cut from a sample block 1402 made using this example superalloy powder mixture (after heat treatment). Sample block 1402 was generated with an SLM printer and AM processing parameters corresponding to those that were used to generate the sample block 202 made of the CM 247 LC superalloy that is illustrated in FIG. 2. Cracking healing occurred in the sample block 1402 shown in FIG. 14 to achieve sizes/volumes of cracks and pores that are substantially less than the cracks and pores illustrated in the CM 247 LC sample block of FIG. 2.

In example embodiments, after heat treatment the crack healing AM process produces substantially less cracks and pores in the additive portion compared to if the AM process had been carried out using a single powder corresponding to only one of the base alloy or the high melt superalloy.

In this cracking healing example, the heat treatment (during which crack healing occurs) may for example include a step of heating the sample block in a furnace above 1200° C. for at least 12 hours. The heat treatment process for this described crack healing AM process may also include one or more of the heat treatment steps previously described with respect to the LAAM process. However, it should be appreciated that this cracking healing heat treatment may be carried out with more or less steps or different steps, temperatures, heating/cooling rates, and time ranges depending the extent of crack healing (and homogenization) that is needed for the particular part that is being produced and/or depending on chemistries of the particular high melt superalloy powder and eutectic powder that were used to create the base alloy of the additive portion.

The following example (shown in Table XII) of a Ni—Cr—Ti—Zr eutectic powder chemistry (when used to form a superalloy powder mixture in combination with a high melt superalloy powder mixture such as CM 247 LC superalloy illustrated in Table II, René 142 superalloy illustrated in Table VII or other superalloys) may be capable of achieving the reductions in microcracking that were illustrated in the sample block 1402 shown in FIG. 14:

TABLE XII

Low Melt Eutectic powder (Ni—Cr—Ti—Zr) Example Chemistries

| Element | Wt % |
|---|---|
| Cr | about 6-about 11, for example 6.0-10.0 |
| Co | 0-about 1, for example 0-1.0 |
| Ti | about 5-about 9, for example 5.0-9.0 |
| Al | 0-about 1, for example 0-1.0 |
| W | 0-about 1, for example 0-1.0 |
| Mo | 0-about 0.55, for example 0-0.55 |
| Ta | 0-about 1, for example 0-0.05 |
| C | 0-about 0.08, for example 0-0.08 |
| Zr | about 9-about 13, for example 9.0-13.0 |
| Hf | 0-about 0.05, for example 0.0-0.05 |
| Re | 0-about 0.05, for example 0.0-0.05 |
| Y and/or Ce | 0-about 0.1, for example 0-0.07 |
| B | 0-about 0.04, for example 0.0-0.016 |
| Ni and optional incidental elements and unavoidable impurities | Balance |

Alterative embodiments may be carried out with a Ni—Cr—Ti Eutectic powder having a chemistry such as illustrated in the following Table XIII:

TABLE XIII

Low Melt Eutectic powder (Ni—Cr—Ti) Example Chemistries

| Element | Wt % |
|---|---|
| Cr | about 15-about 19, for example 15.0-19.0 |
| Co | 0-about 1, for example 0-1.0 |
| Ti | about 20-about 25, for example 20.0-25.0 |
| Al | 0-about 1, for example 0-1.0 |
| W | 0-about 1, for example 0-1.0 |
| Mo | 0-about 0.55, for example 0-0.55 |
| Ta | 0-about 1, for example 0-0.05 |
| C | 0-about 0.08, for example 0-0.08 |
| Zr | 0-about 1, for example 0-0.014 |
| Hf | 0-about 0.05, for example 0.0-0.05 |
| Re | 0-about 0.05, for example 0.0-0.05 |
| Y and/or Ce | 0-about 0.1, for example 0-0.07 |
| B | 0-about 0.04, for example 0.0-0.016 |
| Ni and optional incidental elements and unavoidable impurities | Balance |

Although the previous examples of the LAAM process and the crack healing AM process may involve the use of an SLM type 3D printer, it should be understood that alternative embodiments may carry out the described processes with other types of additive systems, including 3D printers and/or welders. For example, the additive system 100 may include laser powder deposition (LPD) or laser metal deposition (LIVID) 3D printers, which are a type of directed energy deposition (DED) that use a nozzle, which emits a laser beam to melt powdered material blown out of the nozzle while moving along toolpaths to build up layers of a superalloy. In a further example, the additive system 100 may include a laser wire deposition (LWD) system, which employs a welding wire that similarly moves along toolpaths to build up material provided via melting the welding wire with a laser (or other energy source).

It should be understood that the term layer may refer to a layer of metal powder particles or a layer of deposited metal powder bound via a binder (before the metal powder has been melted and/or sintered together). Also, the term layer may refer to an additive layer, filler, or cladding of the solidified deposited superalloy material after the powder has been melted and solidified (or sintered) in fused connection with a substrate and/or a prior layer. Further, although the energy source 110 depicted in FIG. 1 has been described as a laser that emits a laser beam, it should be appreciated that alternative embodiments may use other forms of energy sources to melt and fuse and/or sinter the superalloy powder mixture. For example, the energy source 110 may correspond to an electrical current from a welder or an electron emitter that emits an energy beam 108 in the form of high velocity electrons. In other examples (such as with additive portions formed via a binder-based 3D-printer such as described subsequently with respect to FIG. 16 and FIG. 17), the additive system 100 may include an energy source 110 corresponding to a furnace that heat treats the additive portion to burn off the binder and to sinter the metallic powder.

In addition, it should be appreciated that DED, LPD, LIVID, and LWD printing or welding systems (as well as binder-based 3-D printers) may include a robot arm (or other articulating system) that moves a nozzle and/or wire (e.g., welding wire or a filament) relative to a fixed or an articulating build plate upon which the substrate 112 is mounted, so as to deposit material on the side of a component/substrate. Thus, it should be understood that the phrase to "build up" does not require the material to be built-up layer by layer only in a vertical direction, but may include building up the part in a horizontal direction, depending on the technology of the 3D printer that is used. It is to be understood that the additive system 100 discussed herein and schematically depicted in FIG. 1 is intended to be construed broadly to encompass any type of 3D printer or welder system that is capable of using the superalloy powder mixtures described herein to additively create (build up and/or weld together) super alloy components or portions thereof. Further, such a robot arm or other articulating system that moves a nozzle and/or a wire (e.g., a welding wire or a filament), may be included in a CNC system that includes additional tools for machining the component being additively manufactured (i.e., carrying out substantive manufacturing processes such as drilling, milling, and turning).

Figure 15:
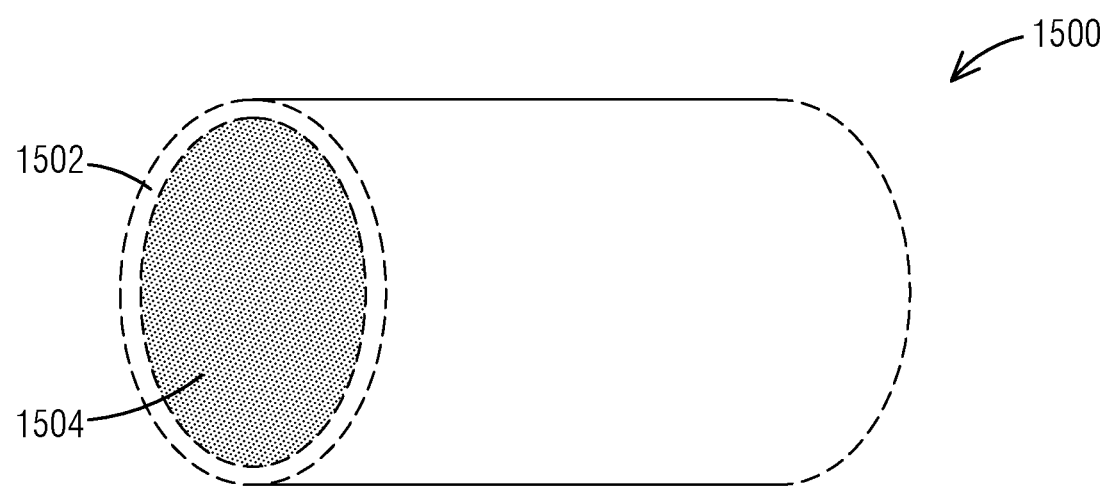
FIG. 15 illustrates a welding wire that may be used in a LWD process to additively manufacture a component (or a portion thereof) or to join superalloy metal parts together.

FIG. 15 shows an example wire in the form of a welding wire 1500 that may be used in a LWD process to additively manufacture a component (or a portion thereof) or to join superalloy metal parts together. The welding wire 1500 may include a cylindrically shaped outer sheath 1502 which functions as a tube, which contains and surrounds the superalloy powder mixture 1504 therein. The sheath may be formed from a relatively thin foil that is rolled into a tubular cored elongated body. The foil wall of the sheath 1502 may for example be between 40 µm to 250 µm thick (or other thickness operative to hold superalloy powder mixture).

In example embodiments, such a sheath 1502 may be comprised of nickel or an alloy that includes nickel and is intended to melt (along with the superalloy powder mixture 1504) to form the base alloy described herein. It should be appreciated that the chemistries of the high melt superalloy powder and/or the low melt superalloy powder (or eutectic powder) that form the superalloy powder mixture 1504 may be modified compared to the examples described herein to account for a portion of the nickel content (and any other elements) being provided from the sheath rather than just from the superalloy powder mixture itself.

Thus, for example, if the nickel contributed by a given length of the sheath 1502 provides 10% by weight of the nickel that will form a given melt pool with the corresponding amount of superalloy powder material provided within this section of the welding wire 1500, then the chemistries of the high melt superalloy powder and/or the low melt superalloy powder (or eutectic powder) therein may include 10% less nickel by weight. Also, the total amounts of elements other than nickel in weight percent in each of the high melt superalloy powder and/or the low melt superalloy powder (or eutectic powder) may be adjusted upwardly (while maintaining their relative proportions to each other) to correspond to the reduction in nickel in weight percent in these powders. However, it should be appreciated that in other examples, only one of the high melt superalloy powder and low melt superalloy powder (or eutectic powder) may be adjusted to account for the nickel provided by the sheath. Also, in other embodiments the reduction in percent weight of nickel contributed by the high melt superalloy powder and the low melt superalloy powder (or eutectic powder) may be different percentages. Further, in other examples, the adjustment of some of the elements in weight percent in the high melt superalloy powder and the low melt superalloy powder (or eutectic powder) may not increase and or may increase in amounts that are not proportional to the adjustment in weight percent for other elements (to account for the reeducations in nickel in these powders).

In addition, although the examples described previously illustrate carrying out the LAAM process and crack healing AM process to produce components comprised of nickel-base superalloy, it should be appreciated that alternative embodiments may be used to produce components comprised of iron-based superalloys, cobalt-based superalloys, or chromium-based superalloys that include higher percentages of iron, cobalt, or chromium than described previously.

The superalloy components 114 or portions thereof that are described herein as being additively manufactured or welded may correspond to components or parts used in gas turbine engines (such as turbine blades, guide vanes, seals, discs, combustors, compressors, and other hot gas path parts). However, it is to be understood that examples described herein may be applicable to additively manufacturing or welding any type of component or portion thereof made from superalloys, including but not limited to reciprocating engine valves, compressors, metal processing tools, turbocharger rotors and seals, rocket engines, reaction vessels, pollution control systems, and/or any other applications or component that may benefit from the use of difficult-to-weld superalloys.

It should also be appreciated that example embodiments may include providing, using, and/or manufacturing powders corresponding to one or more of the high melt superalloy powder, the low melt superalloy powder, eutectic powder, and the superalloy powder mixture. Further, example embodiments may include manufacturing the high melt superalloy, the low melt superalloy, and the eutectic powder by mixing the components of the respective high or low melt superalloy in the proportions described herein at an elevated temperature in a melt, and causing and/or allowing the molten mixture to cool to provide the respective high and low melt superalloy in a solid form. During this process or subsequently these superalloys may be formed into powder configurations.

In further example embodiments of the LAAM process or crack healing AM process, the additive system 100 may include a binder jet 3D printer, microdispensing 3D printer, an extrusion based 3D-printer, or other type of additive system, which is capable of building up layers of the described metal powders combined with a binder (e.g., a wax, polymer, thermoplastic, acrylic, PTFE, and/or other type of binder) that binds the powder together to form the shape of a desired part. Such a part may then be heat treated in a furnace to: burn off the binder; sinter the metal powder particles together; fill pores; and homogenize the base alloy. As used herein such 3D printing processes that involve use of a binder are referred to herein as binder-based 3D printers. Examples of using binder-based 3D printing to generate a component (e.g., pre-sintered preforms) are illustrated in International Publication No. WO 2021/021231 A1, which is hereby incorporated herein by reference in its entirety. An example of a binder-based 3D printer that uses a microdispensing head to dispense metallic powders in combination with a binder is an NScrypt 3D printer produced by NScrypt Inc., Orlando Florida, U.S. However, it should be appreciated that other types of binder-based 3D printers may dispense the powder and the binder separately (such as binder jet 3D printers). Other types of binder-based 3D printers may include 3D printers that extrude heated wire corresponding to a filament having an elongated body. In example embodiments, such a filament may be formed by combining one or more metal powders described herein with a binder. Such a filament may be sufficient long and flexible to be wound in spools. Also, such a filament may comprise greater than 50% by volume metal powders and less than 50% by volume binder. An example of such a binder-based 3D printer that may use such filaments to produce components includes a Markforged Metal X 3D printer produced by Markforged, Inc., Watertown MA, U.S. Examples of binders that may be combined with a metallic powder to form such a filament and/or an additive portion include the polymer systems (e.g., comprising one or more of thermoplastics, polyolefins, polyethylene, polypropylene, and hydrocarbon-based waxes) described in U.S. Pat. No. 10,800,108 B2 issued Oct. 13, 2020, which is hereby incorporated herein in its entirety. However, it should be appreciated that binder-based 3D printer processes and/or extrudable filaments for use with the metallic powders described herein, may use other types of binder materials that are capable of thermally decomposing with minimal residue and/or that can be removed with a solvent.

Figure 16:
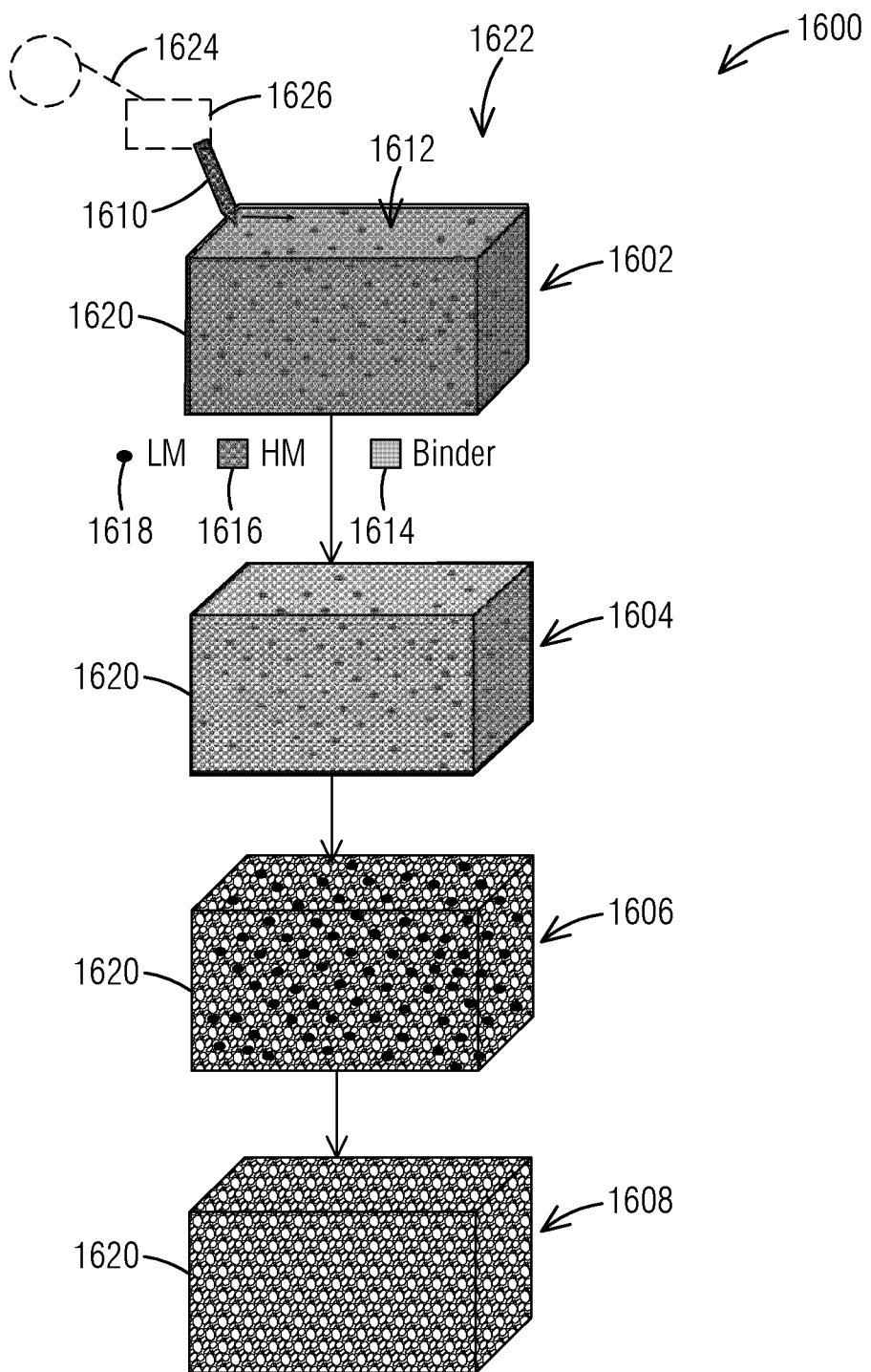
FIG. 16 illustrates a binder-based micro-dispensing 3D printer process that dispenses a binder in combination with a superalloy powder mixture.

FIG. 16 shows an example 1600 of a binder-based 3D printer process that may be used to produce a metal component using the metal powders described herein. In an initial first step 1602, a binder-based 3D printer 1622 may use at least one dispenser 1610 to dispense and/or form a combination 1612 of a binder 1614 and a superalloy powder mixture comprising a high melt powder 1616 and a low melt powder 1618, which is deposited layer by layer to build up a component 1620 (illustrated as a block shape in this example). An example of such a binder-based 3D printer 1622 may include a dispenser 1610 in the form of a micro-dispensing syringe operative to dispense a paste formed of the combination 1612. In an alternative embodiment, the binder-based 3D printer 1622 may include a dispenser 1610 corresponding to an extrusion nozzle of an extruder 1626 that is operative to heat a filament 1624 formed of the combination 1612 so that it flows from the nozzle. However, for binder jet type 3D printers, the dispenser 1610 may correspond to multiple dispensers that dispense the superalloy powder mixture and binder separately to form the described combination. In a second step 1604, the component 1620 may be heat treated in a furnace at a temperature and an amount of time (such as between 300° C. and 500° C. for 30 minutes), which is capable of burning out the binder 1614 (leaving the component with internal pores). In a third step 1606, the component 1620 may be heat treated in a furnace at a temperature and an amount of time (such as between 1000° C. and 1200° C. for 2 hours), to solid state sinter the component. In a fourth step 1608, the component 1620 may be heat treated in a furnace at a temperature and amount of time which is capable of liquid phase sintering and homogenizing the component. For example, the component may be heated to a temperature between 1200° C. and 1300° C., and held in this temperature range for 1 to 60 minutes so that the portions formed from the low melt powder 1618 (or eutectic powder melt) melt and pull on the portions formed from the high melt superalloy powder to fill pores and provide the component with a sufficiently low porosity suitable for high temperature superalloy applications (e.g., >99.9% density relative to the component having zero porosity). In a continuation of the fourth step 1608, the heat treatment may continue to substantially homogenize the base alloy of the component by maintaining the base alloy at or above the solution heat treatment temperature of the base alloy for an extended time such as 12 hours, followed by cooling to room temperature. For example, such a solution heat treatment may include holding the temperature of the component between 1200° C. to 1250° C., for 120 to 1444 minutes; and argon cooling the additive portion to room temperature.

In this example described with reference to FIG. 16 (and the example described subsequently in FIG. 17), the low melt powder has a relatively lower solidus temperature than the high melt powder. For example, the solidus temperature of the low melt powder may be at least 50° C. below the solidus temperature of the high melt powder. In these examples, the low melt powder may correspond to a low melt superalloy powder 106 described herein or a eutectic powder described herein. Also, the high melt powder may correspond to a high melt superalloy powder described herein or another superalloy powder. It should also be appreciated that the superalloy powder mixture in the combination 1612 may be a further example of a superalloy powder mixture 102 described herein, and the component 1620 may be a further example of the additive portion 118 described herein, which in this example is formed by successively depositing and fusing together layers of this superalloy powder mixture via the binder 1714 included with this superalloy powder mixture in the combination 1612. In such an example combination 1612, the ratio of high melt superalloy powder to low melt superalloy powder (or eutectic powder) by weight may range between about 95:05 and about 51:49; alternatively between about 90:10 and about 60:40; alternatively between about 90:10 and about 70:30; alternatively between about 85:15 and about 75:25; alternatively between about 82:18 and about 78:22; and alternatively between about 94:06 and about 76:24.

Figure 17:
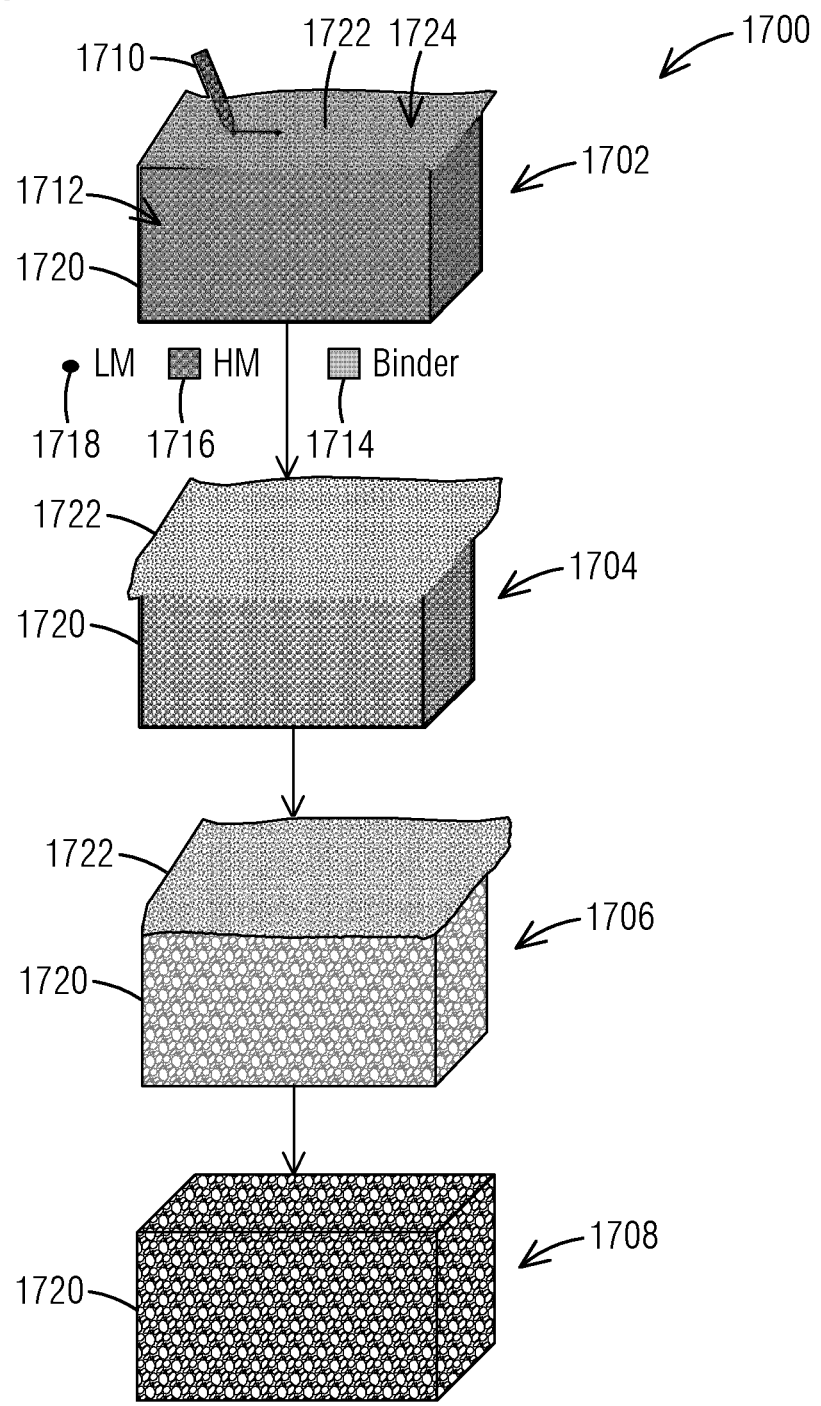
FIG. 17 illustrates a further binder-based micro-dispensing 3D printer process that dispenses a binder in combination with a superalloy powder mixture.

FIG. 17 shows a further example 1700 of a binder-based 3D printer process that may be used to produce a metal component using the metal powders described herein. In an initial first step 1702, at least one dispenser 1710 may be operated to dispense a first combination 1712 of a binder 1714 and a superalloy powder mixture comprising a high melt powder 1716, layer by layer to build up a component 1720 (illustrated as a block shape in this example). As part of this first step 1702, the at least one dispenser 1710 (or a different at least one dispenser) is operated to dispense a second combination 1724 of a binder 1714 and a low melt powder 1718, to produce an additional one or more layers (referred to herein as a sheet 1722) on at least portions of the outer surface(s) of the component 1720. In a second step 1704, the component 1720 may be heat treated in a furnace at a temperature and an amount of time (such as between 300° C. and 500° C. for 30 minutes), which is capable of burning out the binder 1714 (leaving the component 1720 and the sheet 1722 with internal pores). In a third step 1706, the component 1720 and sheet 1722 may be heat treated in a furnace at a temperature for an amount of time (such as between 1000° C. and 1200° C. for 2 hours) to solid state sinter the component 1720 and sheet 1722. In a fourth step 1708, the component 1720 and the sheet 1722 may be heated in a furnace at a temperature and amount of time which is capable of liquid phase sintering and homogenizing the component. For example, the component 1720 and sheet 1722 may be heated to a temperature between 1200° C. and 1300° C. and held in this range of temperatures for 1 to 60 minutes so that the sheet 1722 formed from the low melt powder 1718 melts and is pulled into the pores of the component 1720 formed from the high melt powder 1716 in order to provide the component with a sufficiently low porosity suitable for high temperature superalloy applications (e.g., >99.9% density relative to the component having zero porosity). In a continuation of the fourth step 1708, the heat treatment may continue to substantially homogenize the base alloy of the component by maintaining the base alloy at or above the solution heat treatment temperature of the base alloy for an extended time such as 12 hours, followed by cooling to room temperature. For example, such a solution heat treatment may include holding the temperature of the component between 1200° C. to 1250° C., for 120 to 1444 minutes; and argon cooling the additive portion to room temperature.

These described example steps illustrated in FIG. 16 and FIG. 17 allow sintering and homogenization of the component without melting of the high melt powder. Because the high melt powder does not melt in this process, the residual stresses that cause cracking during solidification are not present and/or are substantially reduced, thereby reducing and/or minimizing the presence of pores and microcracking in the component relative to the component being additively manufactured directly from the base alloy.

In addition, in these described examples, a HIP operation may not be needed after the component is formed, since liquid phase infiltration may be capable of producing sufficiently dense structures (e.g., >99.9% density structures as described previously). In addition, by using this described process, the layer thickness can be as minimal as 10 μm for some types of binder-based 3D printers. Thus, components made from high oxidation resistant superalloys may be formed and usable in high temperature applications having portions/features that may be less than 50 μm thick (e.g., 40-50 microns thick superalloy foils). In addition, these described processes (using binder-based 3D printer processes) may be used to produce the pre-sintered preforms as described in International Publication No. WO 2021/021231 A1.

In further embodiments (such as with respect to the process described with respect to FIG. 17), the component 1720 may be formed by a first combination 1712 of the binder and a high melt powder corresponding to a desired conventionally known superalloy (such as René 142, CM 247 LC) or the high melt superalloys described herein. The second combination 1724 that includes the binder 1714 and that is used to form the sheet 1722, may be comprised of low melt powder corresponding to a low melt superalloy powder (or eutectic powder) as described herein or may be a combination of a low melt superalloy powder (or the eutectic powder) and the high melt powder.

In examples where the second combination 1724 includes both the high melt superalloy powder and the low melt superalloy powder, the ratio by weight of the high melt superalloy powder to the low melt superalloy powder may range between about 05:95 and about 30:70; alternatively between about 10:90 and about 25:75; alternatively between about 15:85 and about 25:75; and alternatively between about 18:82 and about 22:78. In this example, the superalloy powder mixture of the second combination 1724 may be a further example of the superalloy powder mixture 102 described herein, and the sheet 1722 may be a further example of the additive portion 118 described herein, which is formed by successively depositing and fusing together layers of the superalloy powder mixture via the binder 1714 included with this superalloy powder mixture in the second combination 1724.

In addition, in many of the examples described herein, the described heat treatments may be carried out in a furnace that is separate from the additive system 100. Thus, embodiments of the LAAM process and crack healing process may include moving the part formed by a 3D printer to a separate furnace in order to carry out the heat treatment of the part.

In FIG. 18, an example methodology 1800 is illustrated that facilitates additively manufacturing a superalloy component (or a portion thereof) according to the example LAAM process described herein. While the methodology is described as being a series of acts that are performed in a sequence, it is to be understood that the methodology may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The methodology 1800 includes an act 1802 of successively depositing and fusing together layers of a superalloy powder mixture comprising a high melt superalloy powder and a low melt superalloy powder to build up an additive portion. The method may also include an act 1804 of heat treating the additive portion at a temperature at or above 1200° C. to form a homogenized base alloy of which the additive portion is comprised, which base alloy has a chemistry defined by the superalloy powder mixture.

In example embodiments of the methodology 1800, the superalloy powder mixture may be comprised of at least 51% by weight of a high melt superalloy powder; and at least 5% by weight of a low melt superalloy powder. The low melt superalloy powder may have a solidus temperature lower than the solidus temperature of the high melt superalloy powder by between 50° C. and 220° C. Each of the high melt superalloy powder, the low melt superalloy powder, and the superalloy powder mixture may have a nickel content by weight greater than 40% and have an aluminum content by weight of at least 1.5% (and alternately an aluminum content by weight of at least 4%, and further alternatively a nickel content by weight greater than 45% and an aluminum content by weight of at least 5.5%).

Also, in example embodiments, of the methodology 1800, the low melt superalloy powder may have a liquidus temperature above 1300° C.

Further, in example embodiments of the methodology 1800, the low melt superalloy powder may include at least 5% by weight of tantalum (and alternatively at least 10% by weight of tantalum), and the high melt superalloy powder may include less than half the content by weight percent of tantalum compared to the content by weight percent of tantalum in the low melt superalloy powder.

In addition, in the methodology 1800, the high melt superalloy powder may include by weight at maximum 4.5% tantalum, alternatively at maximum 4.0% tantalum, alternatively less than 3.5% tantalum, alternatively less than 1.9% tantalum, alternatively at maximum 1.0% tantalum, alternatively at maximum 0.05% tantalum, alternatively 0% tantalum.

It should be appreciated that this described methodology 1800 may include additional acts and/or alternative acts corresponding to the features and acts described previously with respect to the LAAM process.

In FIG. 19, another example methodology 1900 is illustrated that facilitates additively manufacturing a superalloy component according to the example crack healing AM process described herein. The methodology includes an act 1902 of successively depositing and fusing together layers of a superalloy powder mixture comprising a high melt superalloy powder and a eutectic powder to build up an additive portion of the superalloy component. In addition, this example methodology may include an act 1904 of heat treating the additive portion at a temperature at or above 1200° C. to cause crack healing in the additive portion, wherein the heat-treated additive portion defines a base alloy having a chemistry corresponding to the superalloy powder mixture.

In example embodiments of the methodology 1900, the solidus temperature of the eutectic powder may be more than 220° C. below the solidus temperature of the high melt superalloy powder. Also, each of the high melt superalloy powder and the superalloy powder mixture may have a nickel content by weight greater than 40%. In addition, each of the high melt superalloy powder and the superalloy powder mixture may have a nickel content by weight greater than 40% and have an aluminum content by weight of at least 1.5% (and alternately an aluminum content by weight of at least 4%, and further alternatively a nickel content by weight greater than 45% and an aluminum content by weight of at least 5.5%).

It should also be appreciated that this described methodology 1900 may include additional acts and/or alternative acts corresponding to the features and acts described previously with respect to the crack healing AM process and LAAM process.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension, amount, number, quantity, and/or measurement. If no industry standard is available, a variation of twenty percent would fall within the meaning of these terms unless otherwise stated.

Further, open ended ranges such as greater than or less than a particular value should be construed as having unspecified minimums and maximums that are physically possible and reasonable based on the context of the range and example being described. For example, a limitation such as less than 50% (or less than 50 ppm) by weight should be construed as having a lower bound that may be as low as 0% (or 0 ppm) by weight respectively, unless described in a manner or example that conveys a different lower bound. Similarly for example, a percentage range of greater than 50% (or greater than 50 ppm) by weight should be construed as having an upper bound that may be up to 100% (or 1 million ppm) by weight respectively, unless described in a manner or example that conveys a different upper bound.

What is claimed is:

1. A method of additively manufacturing or welding a metal component comprising:
    successively depositing and fusing together layers of a superalloy powder mixture to build up an additive portion; and
    heat treating the additive portion to form a homogenized base alloy of which the additive portion is comprised, which base alloy has a chemistry defined by the superalloy powder mixture,
    wherein the superalloy powder mixture is comprised by weight of about 4% to about 23% chromium, about 4% to about 20% cobalt, 0% to about 8% titanium, about 1.5% to about 8% aluminum, 0% to about 11% tungsten, 0% to about 4% molybdenum, about 1% to about 13% tantalum, 0% to about 0.2% carbon, 0% to about 1% zirconium, 0% to about 4% hafnium, 0% to about 4% rhenium, 0% to about 0.1% yttrium and/or cerium, 0% to about 0.04% boron, 0% to about 2% niobium, greater than 40% nickel, greater than 4% in total of aluminum and optional titanium,
    wherein the superalloy powder mixture is comprised of:
        at least 51% by weight of a high melt superalloy powder comprising by weight at maximum 1.0% tantalum, at least 1.5% aluminum, and greater than 40% nickel; and
        at least 5% by weight of a low melt superalloy powder having a solidus temperature at least 50° C. lower than the solidus temperature of the high melt superalloy powder, having a liquidous temperature above 1300° C., and comprising by weight at least 5% tantalum, at least 1.5% aluminum, and greater than 40% nickel, and wherein the high melt superalloy powder includes less than half the content by weight percent of tantalum compared to the content by weight percent of tantalum in the low melt superalloy powder.

2. The method according to claim 1, wherein the high melt superalloy powder comprises by weight at maximum 0.05% tantalum.

3. The method according to claim 1, wherein the high melt superalloy powder comprises by weight at maximum 0.05% titanium.

4. The method according to claim 1, wherein the high melt superalloy powder comprises by weight at least 12% chromium.

5. The method according to claim 1, wherein the high melt superalloy powder comprises by weight at least 10.6% tungsten.

6. A method of additively manufacturing or welding a metal component comprising:
  successively depositing and fusing together layers of a superalloy powder mixture to build up an additive portion; and
  heat treating the additive portion to form a homogenized base alloy of which the additive portion is comprised, which base alloy has a chemistry defined by the superalloy powder mixture,
  wherein the superalloy powder mixture is comprised by weight of about 4% to about 23% chromium, about 4% to about 20% cobalt, 0% to about 8% titanium, about 1.5% to about 8% aluminum, 0% to about 11% tungsten, 0% to about 4% molybdenum, about 1% to about 13% tantalum, 0% to about 0.2% carbon, 0% to about 1% zirconium, 0% to about 4% hafnium, 0% to about 4% rhenium, 0% to about 0.1% yttrium and/or cerium, 0% to about 0.04% boron, 0% to about 2% niobium, greater than 40% nickel, greater than 4% in total of aluminum and optional titanium,
  wherein the superalloy powder mixture is comprised of:
    at least 51% by weight of a high melt superalloy powder comprising by weight at maximum 4.5 tantalum, at least 1.5% aluminum, and greater than 40% nickel; and
    at least 5% by weight of a low melt superalloy powder having a solidus temperature at least 50° C. lower than the solidus temperature of the high melt superalloy powder, having a liquidous temperature above 1300° C., and comprising by weight at maximum 3.4% cobalt, at least 5% tantalum, at least 1.5% aluminum, and greater than 40% nickel, and wherein the high melt superalloy powder includes less than half the content by weight percent of tantalum compared to the content by weight percent of tantalum in the low melt superalloy powder.

7. A method of additively manufacturing or welding a metal component comprising:
  successively depositing and fusing together layers of a superalloy powder mixture to build up an additive portion; and
  heat treating the additive portion to form a homogenized base alloy of which the additive portion is comprised, which base alloy has a chemistry defined by the superalloy powder mixture,
  wherein the superalloy powder mixture is comprised by weight of about 4% to about 23% chromium, about 4% to about 20% cobalt, 0% to about 8% titanium, about 1.5% to about 8% aluminum, 0% to about 11% tungsten, 0% to about 4% molybdenum, about 1% to about 13% tantalum, 0% to about 0.2% carbon, 0% to about 1% zirconium, 0% to about 4% hafnium, 0% to about 4% rhenium, 0% to about 0.1% yttrium and/or cerium, 0% to about 0.04% boron, 0% to about 2% niobium, greater than 40% nickel, greater than 4% in total of aluminum and optional titanium,
  wherein the superalloy powder mixture is comprised of:
    at least 51% by weight of a high melt superalloy powder comprising by weight at maximum 4.5 tantalum, at least 1.5% aluminum, and greater than 40% nickel; and
    at least 5% by weight of a low melt superalloy powder having a solidus temperature at least 50° C. lower than the solidus temperature of the high melt superalloy powder, having a liquidous temperature above 1300° C., and comprising by weight at least 5% tantalum, at least 8.0% aluminum, and greater than 40% nickel, and wherein the high melt superalloy powder includes less than half the content by weight percent of tantalum compared to the content by weight percent of tantalum in the low melt superalloy powder.

8. The method according to claim 1, wherein the low melt superalloy powder comprises by weight at least 3.8% tungsten.

9. The method according to claim 1, wherein the low melt superalloy powder comprises by weight about 10% to about 20% tantalum.

10. A method of additively manufacturing or welding a metal component comprising:
  successively depositing and fusing together layers of a superalloy powder mixture to build up an additive portion; and
  heat treating the additive portion to form a homogenized base alloy of which the additive portion is comprised, which base alloy has a chemistry defined by the superalloy powder mixture,
  wherein the superalloy powder mixture is comprised by weight of about 4% to about 23% chromium, about 4% to about 20% cobalt, 0% to about 8% titanium, about 1.5% to about 8% aluminum, 0% to about 11% tungsten, 0% to about 4% molybdenum, about 1% to about 13% tantalum, 0% to about 0.2% carbon, 0% to about 1% zirconium, 0% to about 4% hafnium, 0% to about 4% rhenium, 0% to about 0.1% yttrium and/or cerium, 0% to about 0.04% boron, 0% to about 2% niobium, greater than 40% nickel, greater than 4% in total of aluminum and optional titanium,
  wherein the superalloy powder mixture is comprised of:
    at least 51% by weight of a high melt superalloy powder comprising by weight at maximum 4.5 tantalum, at least 1.5% aluminum, and greater than 40% nickel; and
    at least 5% by weight of a low melt superalloy powder having a solidus temperature at least 50° C. lower than the solidus temperature of the high melt superalloy powder, having a liquidous temperature above 1300° C., and comprising by weight at least 3% hafnium, at least 5% tantalum, at least 1.5% aluminum, and greater than 40% nickel, and wherein the high melt superalloy powder includes less than half the content by weight percent of tantalum compared to the content by weight percent of tantalum in the low melt superalloy powder.

11. The method according to claim 7, wherein the high melt superalloy powder comprises the following composition in weight %:

| | |
|---|---|
| Cr | 7.7-18 |
| Co | 10.6-11 |
| Ti | 0-2 |

-continued

| | |
|---|---|
| Al | 4.5-6.5 |
| W | 10.6-11 |
| Mo | 0.30-0.55 |
| Ta | 0-1 |
| C | 0.05-0.08 |
| Zr | 0-1 |
| Hf | 0-0.05 |
| Re | 0-0.05 |
| Y and/or Ce | 0-0.1 |
| B | 0-0.04 | the balance nickel and optional incidental elements and unavoidable impurities; and
wherein the low melt superalloy powder comprises the following composition in weight %:

| | |
|---|---|
| Cr | 9.5-10.5 |
| Co | 2.9-3.4 |
| Ti | 0-2 |
| Al | 8-9 |
| W | 3.8-4.3 |
| Mo | 0.8-1.2 |
| Ta | 10-20 |
| C | 0-0.08 |
| Zr | 0-1 |
| Hf | 3-12 |
| Re | 0-0.05 |
| Y and/or Ce | 0-0.1 |
| B | 0-0.04 | the balance nickel and optional incidental elements and unavoidable impurities.

12. The method according to claim 11, wherein the high melt superalloy powder and the low melt superalloy powder comprise by weight at maximum 0.01% of one or more unavoidable impurities.

13. The method according to claim 11, wherein the high melt superalloy powder and the low melt superalloy powder comprises by weight at maximum 1.5% of one or more incidental elements other than Cr, Co, Ti, Al, W, Mo, Ta, C, Zr, Hf, Re, Y, Ce and B.

14. The method according to claim 11, wherein the high melt superalloy powder and the low melt superalloy powder comprise one or more incidental elements selected from the following with a respective maximum weight percent or maximum ppm as indicated:

| | |
|---|---|
| S | 30 ppm |
| Nb | 1.5% |
| Mn | 0.6% |
| Fe | 0.05% |

-continued

| | |
|---|---|
| Si | 0.30% |
| P | 50 ppm |
| Mg | 50 ppm |
| Cu | 0.01% |
| N | 60 ppm |
| O | 250 ppm |
| Ag | 1 ppm |
| As | 5 ppm |
| Bi | 0.1 ppm |
| Cd | 2 ppm |
| Ga | 25 ppm |
| In | 0.2 ppm |
| Pb | 2 ppm |
| Sb | 2 ppm |
| Se | 1 ppm |
| Sn | 10 ppm |
| Te | 0.1 ppm |
| Tl | 0.2 ppm |
| Zn | 5 ppm |
| V | 1.5%. |

15. The method according to claim 11, wherein for the high melt superalloy powder and the low melt superalloy powder the unavoidable impurities are within the maximum amounts for the respective incidental elements and for any other elements that maximum is 0.001% by weight.

16. The method according to claim 1, wherein heat treating the additive portion includes heat treating the additive portion at a temperature at or above 1200° C. to form the homogenized base alloy of which the additive portion is comprised.

17. The method according to claim 1, wherein the superalloy powder mixture is deposited and fused together via:
a selective laser melting (SLM) 3D printer to form the additive portion; and/or
a directed energy deposition (DED) nozzle that both provides the superalloy powder mixture and emits an energy beam that melts the superalloy powder mixture to form the additive portion.

18. The method according to claim 1, wherein the superalloy powder mixture is deposited and fused together via a laser wire deposition (LWD) system, which employs a welding wire to provide the superalloy powder mixture.

19. The method according to claim 1, wherein the superalloy powder mixture is deposited and fused together with a polymer binder via a binder-based 3D-printer to form the additive portion, wherein at least one heat treatment is carried out in at least one furnace that burns off the binder, sinters the superalloy powder mixture, causes the superalloy powder mixture to at least partially fill in pores in the additive portion, and at least partially homogenizes the additive portion.

* * * * *